United States Patent
Ichapurapu et al.

(10) Patent No.: US 10,531,316 B1
(45) Date of Patent: Jan. 7, 2020

(54) METHODS AND SYSTEMS FOR USING SHARED ANTENNAS FOR MULTI-PROTOCOL COMMUNICATION

(71) Applicant: Amazon Technologies, Inc., Seattle, WA (US)

(72) Inventors: Ravi Ichapurapu, Morgan Hill, CA (US); Sameet Ramakrishnan, Saratoga, CA (US); Jagan Vaidyanathan Rajagopalan, San Jose, CA (US); Jay Shah, Milpitas, CA (US); Rohit Sammeta, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 16/023,382

(22) Filed: Jun. 29, 2018

Related U.S. Application Data

(60) Provisional application No. 62/654,036, filed on Apr. 6, 2018.

(51) Int. Cl.
| | |
|---|---|
| *H04B 7/00* | (2006.01) |
| *H04W 24/02* | (2009.01) |
| *H04W 76/23* | (2018.01) |
| *H04W 48/18* | (2009.01) |
| *H04W 36/30* | (2009.01) |
| *H04W 72/04* | (2009.01) |
| H04W 88/10 | (2009.01) |

(52) U.S. Cl.
CPC ......... *H04W 24/02* (2013.01); *H04W 36/30* (2013.01); *H04W 48/18* (2013.01); *H04W 72/0446* (2013.01); *H04W 76/23* (2018.02); H04W 88/10 (2013.01)

(58) Field of Classification Search
CPC ..... H04W 24/02; H04W 76/23; H04W 36/30; H04W 48/18; H04W 72/0446
USPC .......................................... 455/41.2
See application file for complete search history.

(56) References Cited

U.S. PATENT DOCUMENTS

| | | | |
|---|---|---|---|
| 8,780,752 B2 * | 7/2014 | Linsky ................ | H04W 52/243 370/252 |
| 9,236,896 B2 * | 1/2016 | Yeh ........................ | H04B 1/406 |
| 9,504,092 B2 * | 11/2016 | Chiou ................... | H04L 5/1469 |
| 2011/0009060 A1 * | 1/2011 | Hsu ........................ | H04W 52/16 455/41.2 |

* cited by examiner

*Primary Examiner* — Sonny Trinh
(74) *Attorney, Agent, or Firm* — Eversheds Sutherland (US) LLP

(57) ABSTRACT

Systems, methods, and computer-readable media are disclosed for using shared antennas for multi-protocol communication. Example devices may include a first antenna, a second antenna, memory and at least one processor configured to access the memory and execute computer-executable instructions to determine a first request for a first wireless radio to transmit first data for a first duration, determine a second request for a second wireless radio to receive second data during the first duration, and determine that a first signal strength associated with the first wireless radio is less than or equal to a first threshold. Certain embodiments may be configured to determine that communication associated with the first wireless radio has a higher priority than communication associated with the second wireless radio, cause the first wireless radio to transmit the first data using a first antenna for the first duration, and cause a second antenna to be idle.

20 Claims, 10 Drawing Sheets

METHODS AND SYSTEMS FOR USING SHARED ANTENNAS FOR MULTI-PROTOCOL COMMUNICATION

CROSS-REFERENCE TO RELATED APPLICATION

This application claims the benefit of U.S. Provisional Application No. 62/654,036, filed Apr. 6, 2018, which is incorporated by reference in its entirety.

BACKGROUND

Electronic devices may use multiple antennas for different forms of electronic communication. For example, a device may have a dedicated antenna for Bluetooth communications and a dedicated antenna for WiFi communication. However, some devices may have relatively small form factors, which may limit the amount of space available for dedicated antennas and/or for physical separation between antenna(s). As a result, radio interference may result in reduced communication performance for wireless communication.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
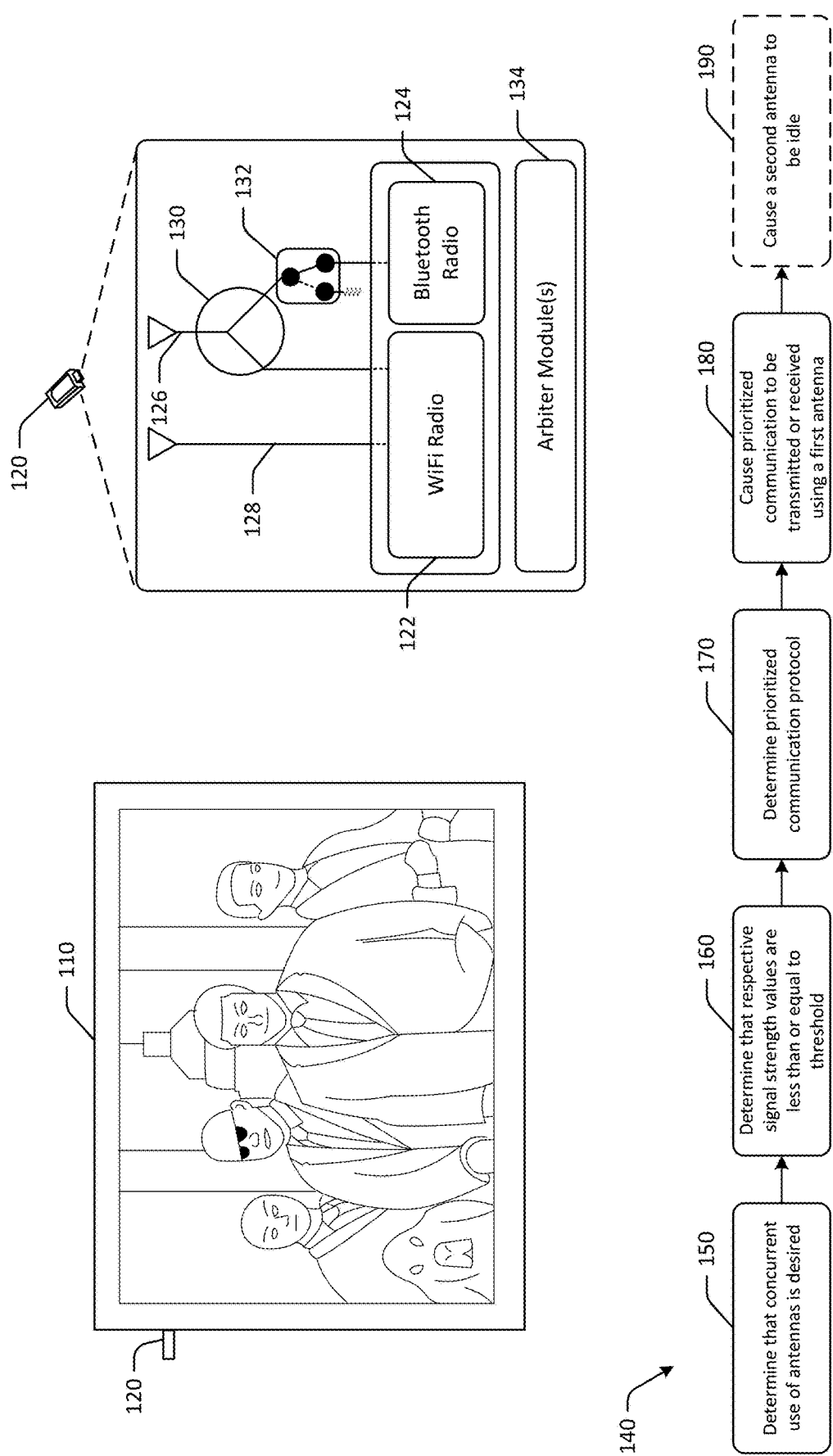
FIG. 1 is a schematic hybrid illustration of an example device with a directional coupler and an example process flow in accordance with one or more example embodiments of the disclosure.

Performance of electronic devices may be impacted by size restrictions, such as small form factors. For some electronic devices, such as those with small form factors or device housings that are limited in size, radio interference for wireless communications may be increased due to reduced distances between components such as antennas of the device. Radio interference may result in reduced or negatively impacted performance of the device, which in turn may negatively impact a user experience with the device. For example, a content streaming device that is used to stream video may stream content at a reduced bitrate (e.g., dropping from 4K to 1080p, etc.) as a result of radio interference and/or poor wireless transmission and/or reception at the device. In one example, concurrent use of WiFi and Bluetooth antenna(s) and/or radios can cause radio interference, which may be a result of limited isolation between the respective antenna(s). Radio interference may be more apparent in devices with limited physical separation between the respective antenna(s), particularly in devices with relatively small form factors or compact design. To address this issue, some devices may have larger form factors and/or additional components, such as dedicated antennas. For example, a device may have two dedicated WiFi antennas, and a dedicated Bluetooth antenna, for a total of three antennas. However, devices with smaller form factors may not be able to include three antennas due to space limitations. With reduced antennas, wireless communication may be negatively impacted in such devices. Embodiments of the disclosure, however, include devices with two-antenna systems that perform similar to, or better than, devices with three antennas, while maintaining a relatively small form factor.

Embodiments of the disclosure include systems and methods for using shared antennas for multi-protocol communication. Certain embodiments may use a reduced number of antenna(s) while maintaining similar performance relative to systems with an increased number of antenna(s). For example, certain embodiments may include two antenna(s) that perform similar to systems with three antenna(s) (e.g., a 2×2 system with two antenna(s) for WiFi communication, etc.). In some embodiments, one or more antenna(s) may be shared with two different radios. For example, one of two antenna(s) may be shared between a WiFi radio and a Bluetooth radio.

This disclosure relates to, among other things, devices, systems, methods, computer-readable media, techniques, and methodologies for using shared antennas for multi-protocol communication. Certain embodiments use intelligent determinations to handle concurrent use requests for one or more antennas of the device, where one or more of the antennas can be shared between multiple radios of the device. Some embodiments may implement one or more software or hardware changes that can allow for electronic devices to have relatively small form factors with relatively high wireless performance. In some instances, embodiments of the disclosure may implement one or more changes to operations performed at, or using, antenna systems of an electronic device.

For devices where space for electrical components is limited, such as space limited by form factor, there may not be enough room to provide a dedicated antenna for Bluetooth or other communication types. As a result, Bluetooth (or another communication type) may share an antenna with WiFi. Sharing may limit performance to time-division-duplex (TDD), which may reduce WiFi throughput due to Bluetooth activity. This in turn may create issues for devices or services that require or use high WiFi throughput to stream (e.g., 4k video, up to 30 Mbps, etc.).

Embodiments of the disclosure include systems and methods that operate Bluetooth and WiFi radios simultaneously, using at least one shared antenna. Certain embodiments may more than double WiFi throughput under certain WiFi conditions, which may enable concurrent WiFi and Bluetooth use cases (e.g., streaming to a Bluetooth speaker+WiFi video streaming+Bluetooth remote volume adjustment, etc.) which may not otherwise possible.

Certain embodiments may use a directional coupler to achieve Bluetooth/WiFi isolation. Certain embodiments may include an optional protection circuit for Bluetooth when WiFi is transmitting. Certain embodiments may modify the allowed concurrency modes of Bluetooth/WiFi when the coupler is used. Certain embodiments may implement WiFi rate protection when Bluetooth transmission is concurrently operating by use of a protection frame. Some embodiments may include a WiFi/Bluetooth RF interface on a PCB with a directional coupler interface to a single antenna.

Electronic devices may include multiple radios, for example, WiFi, Bluetooth classic, Bluetooth low energy, Zigbee, and/or other radios. These radios may operate in close physical proximity (e.g., with limited electrical isolation between them), and in the same or similar frequency bands. This may result in interference between the radios, which degrades performance in concurrent use cases. One example is when a device is streaming a movie over WiFi while distributing the audio to a Bluetooth speaker.

In some devices, such as devices with small form factors, only two antennas may be allocated, due to limited form-factor/space. As WiFi and Bluetooth (for example) may therefore share an antenna, they must split the available airtime, resulting in reduced throughput for both. This reduced throughput translates directly to reduced wireless range, and limitations in the concurrent use cases that can be supported.

Embodiments of the disclosure may include a joint RF architecture and arbitration algorithm which together multiplex Bluetooth and WiFi onto two antenna(s), while achieving performance comparable to a three antenna design. Some embodiments may include WiFi Rx (reception) rate protection from Bluetooth Transmission (transmission).

Referring to FIG. 1, an example use case 100 for using shared antennas for multi-protocol communication is depicted in accordance with one or more example embodiments of the disclosure. In FIG. 1, at a first instance 110, a content streaming device 120 may be used to stream digital content for display at a television. The content streaming device 120 may also be streaming Bluetooth audio to a Bluetooth speaker device.

The device 120 may include a two antenna system. For example, the device 120 may include a WiFi radio 122, a Bluetooth radio 124, a first antenna 126, a second antenna 128, a directional coupler 130, an optional switch 132, and one or more arbiter module(s) 134. The example of FIG. 1 is an example 2×2 WiFi+Bluetooth combo System on a Chip (SoC). The arbiter module 134 may be a firmware implemented module that receives requests for and/or controls access to the first antenna 126 and the second antenna 128. The arbiter module 134 may determine, using radio and/or communication state information and requests, which radio accesses which antennas at which times.

Although described in the context of a device with two antennas, other embodiments may include a single antenna that can be shared between multiple radios, or more than two antennas, such as 2×3 systems (where two antennas are used to transmit data, and three antennas are used to receive data, etc.), 3×3 systems (three transmitting antennas and three receiving antennas, etc.), and so forth.

The first antenna 126 may be sharable or shared between the WiFi radio 122 and the Bluetooth radio 124. The second antenna 128 may be a dedicated WiFi antenna. The directional coupler 130 may be an RF coupler that splits input signals from the first antenna 126 to both WiFi and Bluetooth receive chains (also referred to as paths), and may combine WiFi and Bluetooth transmissions onto the first antenna 130. The directional coupler 130 may be an RF coupler configured to (i) split input signals from the first antenna 126 to both WiFi receive chain and Bluetooth receive chain, and (ii) combine WiFi and Bluetooth transmissions onto the first antenna 126. The directional coupler 130 may be implemented, in some embodiments, as strip lines on a printed circuit board. The optional switch 132 may be an optional single pole double throw switch disposed on the Bluetooth RF path, which can be switched to a termination resistance to isolate the Bluetooth path from the WiFi path. For example, the switch 132 may be switched between a resistor and the Bluetooth radio path. When coupled to the resistor, the Bluetooth radio may not be able to communicate using the first antenna 126, and when coupled to the Bluetooth radio path, the Bluetooth radio may be able to communicate using the first antenna 126.

If only Bluetooth or WiFi is operating, a firmware arbiter (e.g., arbiter module(s) 134) grants antenna access to that radio. For simultaneous operations, the firmware acts as described below. The arbiter module 134 deals with at least four WiFi and Bluetooth arbitration scenarios. Each can act as transmitter (Transmission) or receiver (Rx): WiFi Transmission/Bluetooth Transmission, WiFi Rx/Bluetooth Rx, WiFi TRANSMISSION/Bluetooth Rx, WiFi Rx/Bluetooth Transmission:

For WiFi transmission and Bluetooth transmission, the arbiter module(s) 134 may allow concurrent operation. The arbiter module(s) 134 may switch the front-end switch 132 to the Bluetooth path. WiFi operates as a 2×2 transmitter on both the first antenna 126 and the second antenna 128, while Bluetooth's transmission signal is combined onto the first antenna 126 through the coupler 130.

For WiFi reception and Bluetooth reception, the arbiter module(s) 134 may allow this operation. The arbiter module(s) 134 may switch the switch 132 to the Bluetooth path. WiFi operates as a 2×2 receiver using both the first antenna 126 and the second antenna 128. Simultaneously, the first antenna 126 signal flows through the power coupler 130 to the Bluetooth receiver 124, such that Bluetooth can receive simultaneously on the first antenna 126. When WiFi need to transmit MAC acknowledgements, the arbiter module(s) 134 switches the switch 132 to the termination resistor, to protect the Bluetooth path from the high voltage WiFi transmission.

For WiFi reception and Bluetooth transmission, the arbiter module(s) 134 may allow the Bluetooth transmission to overlap with WiFi reception. However, due to possible limited isolation between WiFi and Bluetooth, Bluetooth transmissions may cause degradation to WiFi receive performance. The access point may thus think that the WiFi receiver is in bad condition, and lower its data throughput to the WiFi receiver. To prevent this, the arbiter acts as illustrated in a process flow 300 of FIG. 3. For example, if WiFi cannot receive with Bluetooth interference, the arbiter module(s) 134 initiates the device to transmit a frame to tell the AP to buffer any traffic. It then allows Bluetooth to use the antenna, and then finally polls the AP to fetch its traffic.

Figure 5:
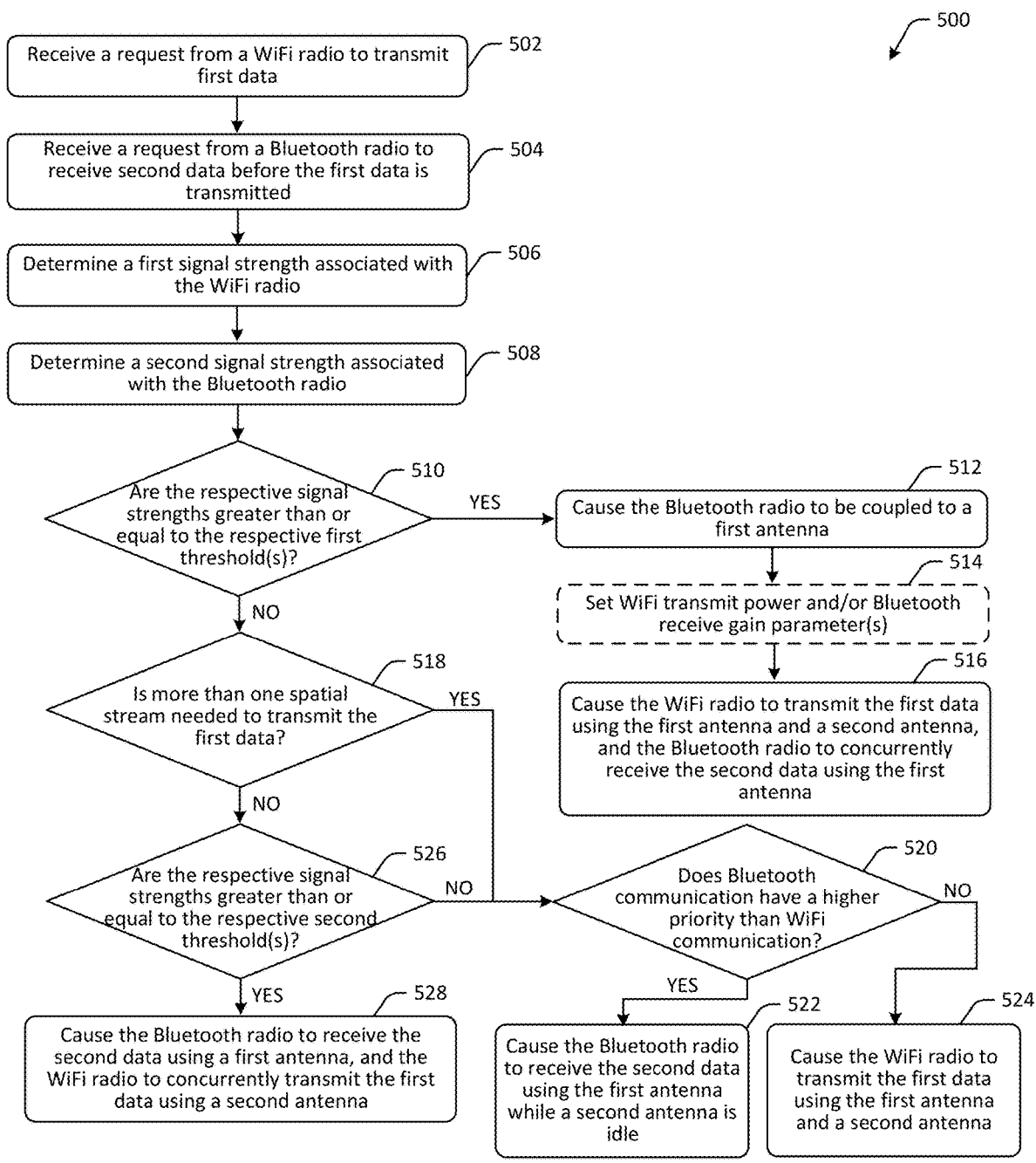
FIG. 5 is a schematic illustration of an example process flow for using shared antennas for multi-protocol communication in accordance with one or more example embodiments of the disclosure.

For WiFi transmission and Bluetooth reception, the arbiter module(s) 134 may implement process flow 500 in FIG. 5.

To use shared antennas for multi-protocol communication, an example process flow 140 is presented and may be performed, for example, by the content streaming device 120 and/or under the control of one or more remote servers. In the illustrated embodiment, the content streaming device 120 may include at least one memory that stores computer-executable instructions and at least one processor configured to access the at least one memory and execute the computer-executable instructions to perform various actions or operations, such as one or more of the operations in the process flow 140 of FIG. 1.

At a first block 150, the content streaming device 120 may determine that concurrent use of antennas is desired. For example, a request to access one or both the first antenna 126 and the second antenna 128 may be received from both the WiFi radio 122 (e.g., from a WiFi radio MAC, etc.) and the Bluetooth radio 124 (e.g., from a Bluetooth radio MAC, etc.).

At block 160, the content streaming device 120 may determine that respective signal strength values are less than or equal to a threshold. For example, based at least in part on whether the respective WiFi and Bluetooth signal strengths satisfy certain thresholds, concurrent use of the antennas may be permitted. In this example, the signal strength values may not satisfy the threshold.

At block 170, the content streaming device 120 may determine a prioritized communication protocol. For example, the device may determine whether Bluetooth communication or WiFi communication is prioritized over the other. Because concurrent use may not be permitted, the prioritized communication protocol may be granted access. Priority may be determined based at least in part on active applications at the device, user preferences, and/or other factors.

At block 180, the content streaming device 120 may cause the prioritized communication to be transmitted and/or received using a first antenna. For example, if the WiFi communication is prioritized, the WiFi communication may be transmitted or received using the first antenna 126 (and potentially the second antenna 128). If the Bluetooth communication is prioritized, the Bluetooth communication may be transmitted or received using the first antenna 126, while the second antenna 128 may be held idle or used by the WiFi radio 122.

At optional block 190, the content streaming device 120 may cause a second antenna to be idle. For example, if the Bluetooth communication is prioritized, the Bluetooth communication may be transmitted or received using the first antenna 126, while the second antenna 128 may be held idle during the Bluetooth communication.

Some embodiments may remove the coupler and fall back to TDD and disallow the problematic use case in the 2.4 GHz band if issues arise. Bluetooth range is the critical check—in particular, if $10m$ distance can be maintained with 3 dB insertion loss. Added costs may be minimal.

Assume an even 3 dB split between through and coupled ports, with 20 dB isolation between the ports as the design point. For WiFi transmission, the insertion loss on WiFi may be an important metric. In some embodiments, there may be two WiFi antenna(s) transmitting. Assuming close to 0 dB loss on the WF0 path, with no transmission beamforming, if there were 0 dB loss on WF1, there would be a 3 dB power combining gain. With 3 dB loss on WF1 path, the power combining gain drops to:

$$10\log_{10}\left(10^{\frac{0}{10}} + 10^{-\frac{3}{10}}\right) = 1.8 \text{ dB}$$

Because there are two antenna(s), the WiFi transmitter takes a 1.2 dB insertion loss penalty, relative to a case of dedicated WiFi antenna(s). Note that this loss is independent of whether the device is sending two streams or one stream. The two streams will combine in space, and be received equally at the receiver. Accordingly, the total radiated power may be considered.

If the device uses transmission beamforming, it would get a 6 dB range boost with 0 db insertion loss on WF1. Due to the insertion loss, it would only get 3.5 dB, resulting in a 2.5 dB degradation.

Note that in some devices, the link will be downlink dominated due to 1) Rx desense 2) Much lower bandwidth requirement on the Transmission uplink. Even if the receiver desense was best case (−87 dBm/20 MHz, Castle DOE best 10%), the Rx still experiences more desense than this Transmission IL, so the link should still be downlink dominated.

Example embodiments of the disclosure provide a number of technical features or technical effects. For example, in accordance with example embodiments of the disclosure, certain embodiments of the disclosure may improve wireless communication performance while using a reduced number of antennas. Some embodiments may enable concurrent wireless use cases (e.g., high quality video streaming+Bluetooth to speaker+paired Bluetooth remote, etc.) in small form factor devices (e.g., USB stick size devices,) which may not be otherwise possible. Using the technology captured in this disclosure, downgrade of video quality (e.g. from 4k to 1080p) may be avoided under conditions. The above examples of technical features and/or technical effects of example embodiments of the disclosure are merely illustrative and not exhaustive.

Example embodiments of the disclosure provide a number of technical features or technical effects. For example, in accordance with example embodiments of the disclosure, certain embodiments of the disclosure may automatically implement one or more mitigation techniques, determine device temperatures, determine performance of various mitigation techniques, and/or maintain device throughput while reducing power consumption. As a result of improved functionality, throughput may be maintained while mitigating thermal increases. Embodiments of the disclosure may improve computing efficiency and bandwidth by reducing power consumption and maintaining device temperatures using one or more thresholds. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
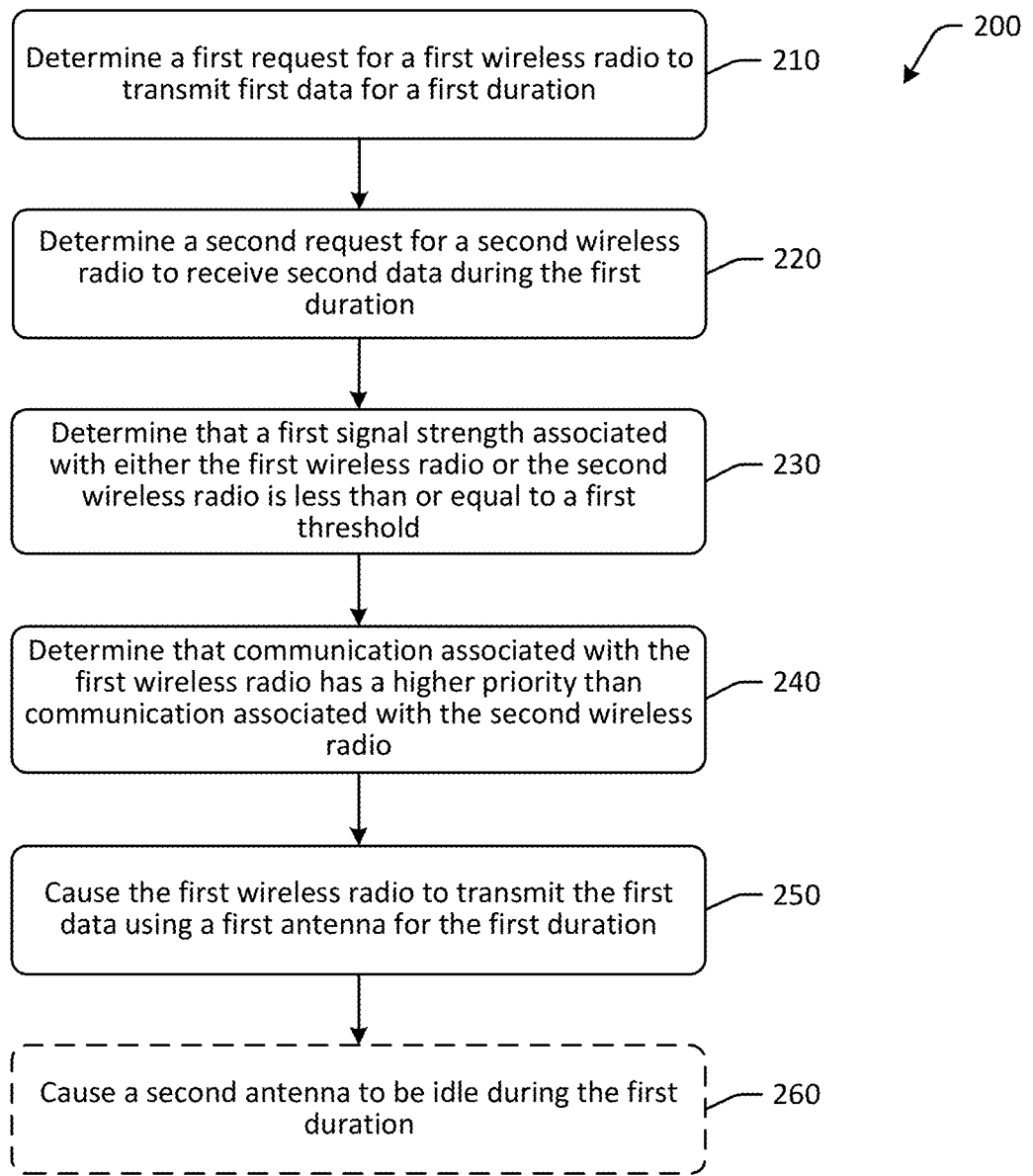
FIG. 2-3 are schematic illustrations of example process flows for using shared antennas for multi-protocol communication in accordance with one or more example embodiments of the disclosure.

FIG. 2 depicts an example process flow 200 for using shared antennas for multi-protocol communication in accordance with one or more example embodiments of the disclosure. While example embodiments of the disclosure may be described in the context of WiFi and/or Bluetooth communications and radios, it should be appreciated that the disclosure is more broadly applicable to any type of electronic device and/or communication protocol. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a content streaming device, may be executed to determine a first request for a first wireless radio to transmit first data for a first duration. For example, a Bluetooth radio of a content streaming device may send a request to transmit first data for a first duration to one or more modules, such as one or more arbiter modules, of the content streaming device. The Bluetooth radio may indicate, for example, that a certain amount of data is desired to be transmitted or received, or a certain length of time is needed for transmission and/or receipt of the first data. The Bluetooth radio may be configured to communication using one of two antennas at the content streaming device in some embodiments. In some embodiments, the first wireless radio may be a WiFi radio or another type of radio.

At block 220 of the process flow 200, computer-executable instructions stored on a memory of a device may be executed to determine a second request for a second wireless radio to receive second data during the first duration. For example, a WiFi radio of a content streaming device may send a request to receive second data to one or more modules, such as one or more arbiter modules, of the content streaming device during the first duration. Accordingly, concurrent use of one or more antennas at the device may be desired between the first wireless radio and the second wireless radio.

The WiFi radio may indicate, for example, that a certain amount of data is desired to be transmitted or received, or a certain length of time is needed for transmission and/or receipt of the first data. The WiFi radio may be configured to communication using both antennas at the content streaming device in some embodiments. In some embodiments, the second wireless radio may be a Bluetooth radio or another type of radio.

At block 230 of the process flow 200, computer-executable instructions stored on a memory of a device may be executed to determine that a first signal strength associated with either the first wireless radio or the second wireless radio is less than or equal to a first threshold. For example, the streaming device may determine a first signal strength (e.g., using a received signal strength indicator (RSSI), etc.) for either the first wireless radio or the second wireless radio. In some embodiments, the streaming device may determine a first signal strength for the first wireless radio and a second signal strength for the second wireless radio.

The streaming device may determine, using the signal strength value(s) (depending on whether one or both signal strengths are determined), whether a first threshold is satisfied. For example, the first threshold may be a threshold signal strength for one of the two radios, or for both of the two radios. In one example, the first threshold may be a signal strength threshold of 65% for the Bluetooth radio or a signal strength threshold of 55% for the WiFi radio. In another example, the first threshold may be a signal strength threshold of 65% for the Bluetooth radio and a signal strength threshold of 55% for the WiFi radio. Accordingly, in another example, the device may determine that a first signal strength associated with either the first or second wireless radio is less than or equal to the first threshold. In other embodiments, the respective signal strengths for the first and second wireless radios may be compared to their respective values (e.g., $(X_1, Y_1)$) to determine whether the first threshold is satisfied.

In an example embodiment, the first signal strength may be associated with the Bluetooth radio, the device may determine a second signal strength that is associated with the WiFi radio. The device may determine that one or both the first and second signal strength are less than or equal to the first threshold.

At block 240, computer-executable instructions stored on a memory of a device may be executed to determine that communication associated with the first wireless radio is prioritized over communication associated with the second wireless radio. For example, the device may determine that communication associated with the Bluetooth radio is prioritized over communication associated with the WiFi radio. Prioritization may be determined, in one example, using a lookup table. Prioritization may be dynamically determined in that communication priority may change based at least in part on factors such as current use of the device (e.g., whether Bluetooth is being used to play music and WiFi is not being used for an active application, etc.), respective buffer levels, protocol-specific factors such as scheduling or communication restrictions, user preferences, and the like. For example, priority may be determined based at least in part on respective buffer levels, so as to avoid emptying of a buffer and negatively impacting a user experience. In this instance, the device may determine that a first buffer level for a first buffer associated with the first wireless radio, such as the Bluetooth radio, is less than a second buffer level for a second buffer associated with the second wireless radio, such as the WiFi radio. Buffer levels may represent an amount of data available in a buffer. In some embodiments, the buffer levels may be compared, while in other embodiments, respective thresholds may be used to determine whether to prioritize one radio communication over the other based on the respective buffer levels. In the example of FIG. 2, the device may determine that communication associated with the first wireless radio, or the Bluetooth radio in this example, is prioritized over communication associated with the second wireless radio, or the WiFi radio in this example.

At block 250, computer-executable instructions stored on a memory of a device may be executed to cause the first wireless radio to transmit the first data using a first antenna for the first duration. For example, the content streaming device may cause the first wireless radio, such as the Bluetooth radio, to transmit the first data using the first antenna of the device for the first duration. Accordingly, the device may grant the request from the first wireless radio. In some embodiments, the device may grant the request because of the first wireless radio priority over the second wireless radio.

To permit the first wireless radio to transmit the first data using the first antenna, the device may cause a switch to couple the first wireless radio to the first antenna. The switch may couple the first wireless radio, such as the Bluetooth radio, to a directional coupler and/or the first antenna. After the first data is transmitted and/or after the first duration, the device may cause the switch to decouple the first wireless radio from the first antenna. The device may therefore transmit, using the first wireless radio, the first data using the first antenna for the first duration, and the device may optionally cause the second antenna to be idle during the first duration.

At optional block 260, computer-executable instructions stored on a memory of a device may be executed to cause a second antenna to be idle during the first duration. For example, the content streaming device may prevent the second wireless radio from communicating using the second antenna during the first duration and/or while the first data is being transmitted. This may be because use of the second antenna may cause interference with the first wireless radio communication, or may otherwise negatively impact performance of the first wireless radio. While the first data is transmitted, the device may therefore cause the second antenna to remain idle, so as to avoid radio interference and/or negatively impacting the transmission of the first data. As a result, the two-antenna system may perform (e.g., as measured by data transfer rates, efficiency, packet loss, and/or other metrics, etc.) like a system that utilizes more than two antennas.

Figure 3:
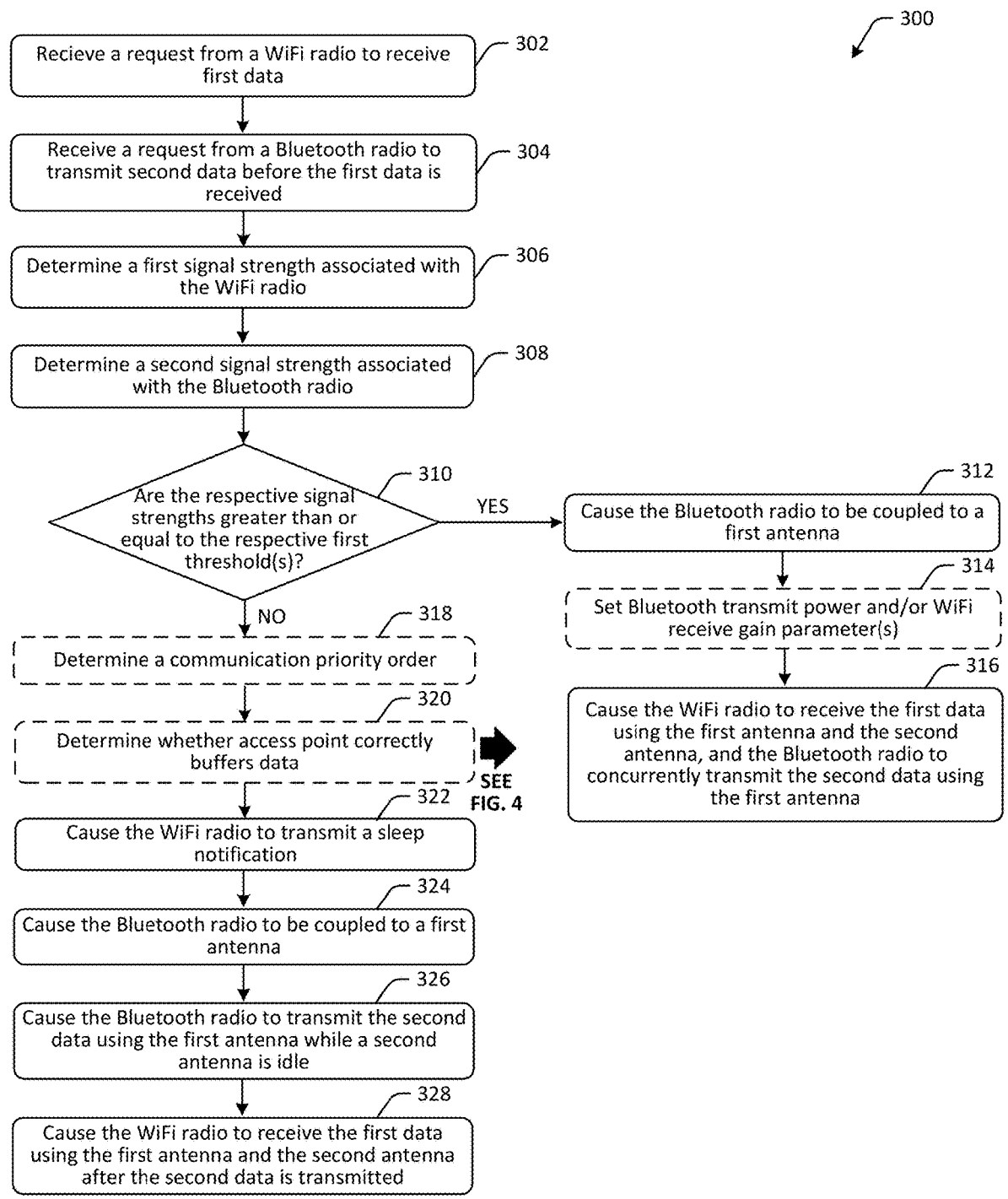

FIG. 3 depicts an example process flow 300 for using shared antennas for multi-protocol communication in accordance with one or more example embodiments of the disclosure. In the example of FIG. 3, a first wireless radio, such as a WiFi radio, may request to receive data, while a second wireless radio, such as a Bluetooth radio, may request to concurrently, or at least partially concurrently, transmit data.

While example embodiments of the disclosure may be described in the context of WiFi and/or Bluetooth communications and radios, it should be appreciated that the disclosure is more broadly applicable to any type of electronic device and/or communication protocol. Some or all of the blocks of the process flows in this disclosure may be performed in a distributed manner across any number of devices. The operations of the process flow 300 may be optional and may be performed in a different order.

At block 302, a request from a WiFi radio may be determined, where the request is to receive first data. For example, one or more modules at a device may determine and/or receive a request to receive first data, where the request is from a WiFi radio. The request may include a data reception duration that represents a length of time for receipt of the first data. For example, the WiFi radio may request to use one or more antennas of the device for a data reception duration of 15 milliseconds during which the first data is to be received. The request may include a start time of the request (e.g., the first data may be received starting in 5 milliseconds for a duration of 15 milliseconds, the first data may be received at 06:52:12 am for a duration of 15 milliseconds, etc.).

At block 304, a request from a Bluetooth radio may be determined, where the request is to transmit second data. The request may be determined before the first data is received. For example, one or more modules at the device may determine and/or receive a request to transmit second data, where the request is from a Bluetooth radio. The request may be received prior to reception of the first data. For example, the request may be received before the first data is received or partially received, or before receipt of the first data is initiated.

The request may include a data transmission duration that represents a length of time for transmission of the second data. The data transmission duration may be protocol-specific, such as a scheduled Bluetooth data transmission or reception interval. In an example, the Bluetooth radio may request to use one or more antennas of the device for a data transmission duration of 5 milliseconds during which the second data is to be transmitted. The request may include a start time of the request (e.g., the second data may be transmitted starting in 5 milliseconds for a duration of 10 milliseconds, the second data may have a transmission start time or initiation time at 06:52:12 am for a duration of 15 milliseconds, etc.). Accordingly, concurrent or partially concurrent use of the antennas at the device may be desired by the WiFi radio and the Bluetooth radio.

At block 306, a first signal strength associated with the WiFi radio may be determined. For example, one or more modules at the device may query a system or component at the device or at a connected device to determine a signal strength associated with the WiFi radio. For example, the device may determine a strength of a signal associated with a WiFi connection to a particular access point or set of devices. The signal strength may be determined, in an example, using a received signal strength indicator that represents the strength of the wireless signal received at the device. In some embodiments, signal strength may be determined using one or more of receive gain, transmit/broadcast power, and the like.

At block 308, a second signal strength associated with the Bluetooth radio may be determined. For example, one or more modules at the device may query a system or component at the device or at a connected device to determine a signal strength associated with the Bluetooth radio. For example, the device may determine a strength of a signal associated with a Bluetooth connection to a particular device, or set of devices. The signal strength may be determined, in an example, using a received signal strength indicator that represents the strength of the wireless signal received at the device. In some embodiments, signal strength may be determined using one or more of receive gain, transmit/broadcast power, and the like.

At determination block 310, a determination may be made as to whether the respective signal strengths are greater than or equal to the respective first threshold(s). For example, one or more modules at the device may be configured to determine whether the first signal strength and/or the second signal strength is greater than or equal to a first threshold. The first threshold may include one or more values. For example, the first threshold may be a percentage value, such as 80%. In this instance, the first signal strength and the second signal strength may be compared to the first threshold value of 80% to determine whether the respective signal strengths are greater than or equal to the 80% threshold. In some embodiments, only one of the signal strengths may have to satisfy the first threshold for a positive determination at block 310, while in other embodiments, both of the signal strengths may have to satisfy the first threshold for a positive determination at block 310. In other embodiments, the first threshold may have different values for the respective signal strengths. For example, the first threshold may have a value of 80% for the WiFi signal strength and a 75% value for the Bluetooth signal strength. In other embodiments, the first threshold may be other values, such as −50 dbm for WiFi and/or −30 dbm for Bluetooth, etc.

The first threshold may be static or dynamic. For example, the first threshold may be stored in a lookup table and may be determined using one or more empirical values, such as parametric values (e.g., part to part values determined in or near real-time, etc.). The first threshold may represent isolation through a coupler (e.g., received signal strength indicator values, etc.) and may be design-specific for different devices.

If it is determined at determination block 310 that the respective signal strengths are greater than or equal to the respective first threshold(s), the process flow 300 may proceed to block 312. At block 312, the Bluetooth radio may be caused to be coupled to a first antenna. For example, the device may cause the Bluetooth radio to be coupled to a first antenna of the device. To couple the Bluetooth radio to the device, the device may cause one or more switches, such as a single pole double throw switch in one example, to electrically couple the Bluetooth radio path to the first antenna. The switch may be switched from a termination resistance and/or resistor to the Bluetooth path.

At optional block 314, the Bluetooth transmit power and/or WiFi receive gain parameters may be set. For example, the device may be configured to set one or more parameters, such as a Bluetooth transmit power and/or WiFi receive gain parameters to facilitate data communication. Because of the positive determination at block 310, both the request at block 302 and the request at block 304 may be granted, for concurrent or partially concurrent use of the antennas of the device. Accordingly, at the optional block 314, the parameters may be set to facilitate the WiFi radio receipt of the first data and/or the Bluetooth radio transmission of the second data.

At block 316, the WiFi radio may be caused to receive the first data using the first antenna and the second antenna, and the Bluetooth radio may be caused to concurrently or partially concurrently transmit the second data using the first antenna. For example, the device (e.g., an arbiter module(s) at the device, etc.) may permit the WiFi radio to receive the first data using both of the antennas at the device, while the Bluetooth radio transmits the second data using the first antenna at least partially concurrently as the WiFi radio uses the first antenna. As a result, the system may perform in an optimized manner, although two antennas are being used, at least one of which is shared between the Bluetooth radio and the WiFi radio.

If it is determined at determination block 310 that the respective single strengths are not greater than or equal to the respective first threshold(s), the process flow 300 may proceed to optional block 318. For example, the device may determine that the Bluetooth signal strength is not greater than or equal to the first threshold and/or the WiFi signal strength is not greater than or equal to the first threshold. In some embodiments, one of the signal strengths may be less than (or equal to, which could be the case in some embodiments) the threshold, while in other embodiments, both of the signal strengths may be less than (or equal to, which could be the case in some embodiments) the threshold. Because the determination at block 310 is negative, the Bluetooth transmission and the WiFi reception may not be able to occur concurrently, because the resultant communications may be interrupted or interfered with by each other, and/or a connected access point may drop a transmission rate, which may negatively impact a user experience of the device.

At optional block 318, a communication priority order may be determined. For example, one or more modules at the device may be configured to determine a communication priority order. In some embodiments, priority order may be determined using a lookup table, while in other embodiments, priority order may be determined in real time. For example, based at least in part on active applications or applications that are actively being used at the device, priority order may change. For example, if a user is using the device for playback of music at a Bluetooth speaker, Bluetooth communication may be prioritized over WiFi communication. This may be because the Bluetooth communication directly impacts a user experience with the music playback, and if the WiFi communication is to determine whether there are any new messages for a user account on the device, the WiFi communication may not be as high of a priority relative to the Bluetooth communication. Other factors, such as buffer levels, time of connection or session, and/or other factors may be used to determine a priority order. In the example of FIG. 3, the device may determine, using a priority table, that the Bluetooth communication is prioritized over the WiFi communication.

At optional block 320, a determination may be made as to whether an access point correctly buffers data. For example, the device may determine whether an access point associated with the WiFi connection correctly buffers data when the device is in a sleep state. To determine whether the access point correctly buffers data, or is compliant with a sleep protocol, the device may perform one or more tests or processes, such as the process described with respect to FIG. 4.

At block 322, the WiFi radio may be caused to transmit a sleep notification. For example, because the WiFi communication is not prioritized over the Bluetooth communication, the WiFi communication may be delayed with respect to the Bluetooth communication. To cause the delay, one or more modules at the device may cause the WiFi radio to transmit a sleep notification to the access point. The sleep notification may indicate to the access point that the device will enter a sleep state for a sleep duration or a sleep length of time. The notification may be a protocol specific sleep notification, such as a null frame, or another notification. In some embodiments, to send the sleep notification, the device may send a ping frame to the access point, and may send a null frame to the access point. The null frame may be sent after the ping frame, and may indicate that the device is going to enter a sleep state. The notification may include, in some embodiments, an indication of a length of time for which the device will be in the sleep state. In some instances, the length of time may be protocol-specific, such that the device may enter an awake state periodically to receive and/or send data to the access point. After sending the notification, in some instances, the access point may optionally send a response to the device. The access point may buffer traffic or data intended for the device during the length of time, during which the device is to be in a sleep state. The length of time may be for an individual sleep state session, or may be for multiple sleep state sessions. In some embodiments, the device may enter a sleep state for a period of time, wake up to receive data, go back to sleep, and so forth until the total length of time spent in the sleep state equals the length of time and/or until the device temperature is at or below the first threshold temperature. By indicating that the device is entering a sleep state, the WiFi communication (which in the example of FIG. 3 is receiving the first data), may be temporarily delayed. The device may transmit, using the WiFi radio, the sleep notification indicating that the WiFi radio will enter a sleep state for the first duration (or the sleep duration), and the device may receive, using the WiFi radio, the second data using the first antenna and the second antenna after the sleep duration.

At block 324, the Bluetooth radio may be caused to be coupled to a first antenna. For example, the device may cause a switch to couple the Bluetooth radio to the first antenna of the device by forming an electrical path between the radio and the first antenna. When the switch is not forming the Bluetooth path, the switch may be coupled to a resistor to isolate the WiFi path from the Bluetooth path.

At block 326, the Bluetooth radio may be caused to transmit the second data using the first antenna while a second antenna is idle. For example, the device may grant the request from the Bluetooth radio to transmit the second data, and the Bluetooth radio may transmit the second data using the first antenna. During the Bluetooth communication, the second antenna of the device may be held in an idle state and/or may be unused by the WiFi radio, so as to avoid radio interference and/or negatively impacting the Bluetooth communication. In some embodiments, the Bluetooth radio may be caused to transmit the second data during the sleep duration that was indicated to the access point. The second antenna may be held idle or may remain unused during the sleep duration.

At block 328, the WiFi radio may be caused to receive the first data using the first antenna and the second antenna after the second data is transmitted. For example, after the second data is transmitted or has been partially transmitted, the device may grant the request of the WiFi radio to receive the first data. In some embodiments, the request may be granted after the sleep duration. The device may cause the switch to decouple the Bluetooth radio from the first antenna and/or to couple the first antenna to a resistor instead of the Bluetooth radio, and the WiFi radio may be permitted to receive the first data using the first antenna and the second antenna.

By implementing the process flow 300, a first wireless radio, such as the WiFi radio, may receive first data, while a second wireless radio, such as the Bluetooth radio, may transmit data. The performance of a two-antenna system implementing the process flow 300 may be comparable to, or improved over, the performance of a three-antenna system performing the same operations.

In implementing the process flow 300, for the WiFi radio to receive data while the Bluetooth radio transmits data, the determination at block 310 is positive. In this instance, the first antenna may be shared between the Bluetooth radio and the WiFi radio, and the second antenna may be used concurrently by the WiFi radio. If the determination at block 310 is negative, the prioritized communication may be completed first, without shared antenna use. For example, the WiFi radio may receive the first data before the Bluetooth radio transmits the second data if the WiFi communication is prioritized, or the Bluetooth radio may transmit the second data before the WiFi radio receives the first data if the Bluetooth communication is prioritized.

In some embodiments, such as in FIG. 3 when the WiFi communication is prioritized over the Bluetooth communication, the device may temporarily switch away from and/or pause the Bluetooth transmission so as to allow the WiFi radio to send an acknowledgment packet to the access point. For example, one or more modules at the device may determine and/or receive a request for the WiFi radio to transmit an acknowledgment notification, such as to an access point. The device may pause and/or interrupt transmission of data by the Bluetooth radio for transmission of the acknowledgment notification.

Figure 4:
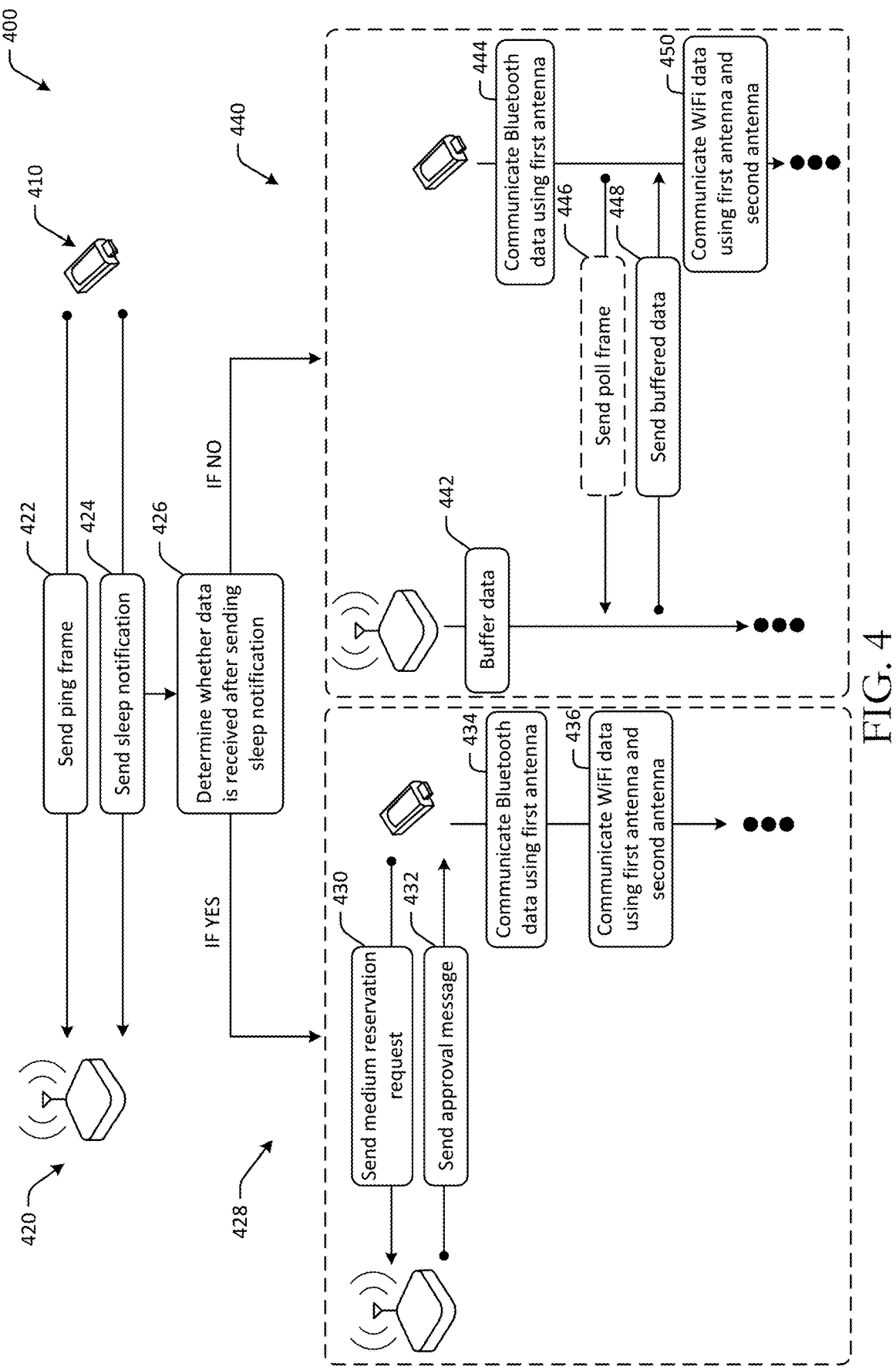
FIG. 4 is a schematic illustration of an example process flow for determining whether an access point correctly buffers data in accordance with one or more example embodiments of the disclosure.

FIG. 4 is a schematic illustration of an example hybrid data and process flow 400 for determining whether an access point correctly buffers data in accordance with one or more example embodiments of the disclosure. Different embodiments may include different, additional, or fewer operations than those illustrated in the example of FIG. 4. The data and process flow 400 may be used to determine whether an access point that an electronic device, such as a content streaming device, is in communication with has a compliant status or a non-compliant status with a sleep protocol.

In some embodiments, when a device is in a sleep state or a sleep mode, data intended for the device may be buffered at an access point if the access point is compliant. The buffered data may be sent to the device at a scheduled wakeup interval or at another time, such as responsive to a request from the device. However, if the access point is non-compliant, the access point may not buffer some or all frames or data intended for the device, and may send the data to the device while the device is in a sleep state. This may cause degraded communication performance and/or may cause the device to prematurely enter an awake state, which may negatively impact communication that is in process from, for example, a Bluetooth radio. Certain embodiments may detect non-compliant access points, and may implement one or more techniques to avoid interference with other communications at the device regardless of the non-compliant status of access points.

At an optional first operation 422 of the data and process flow 400, a streaming device 410 may send a ping frame or ping notification to an access point 420. The ping frame may be used to indicate an active connection between the streaming device 410 and the access point 420. A response message responsive to the ping notification may be received from the access point 420.

At a second operation 424, the streaming device 410 may send a sleep notification to the access point 420. For example, the streaming device 410 may send a null frame to the access point 420. The null frame or other sleep notification may indicate a state of the streaming device 410, such as an awake state or a sleep state, to the access point 420. In this example, the sleep notification may indicate that the streaming device 410 is in a sleep state. However, the streaming device 410 may not enter a sleep state after sending the sleep notification, and may instead remain in an awake state and monitor for frames or data from the access point 420. This may be completed to test whether or not the access point 420 is compliant or non-compliant.

At a third operation 426, the streaming device 420 may determine whether data is received after sending the sleep notification. In particular, the streaming device 420 may determine whether any frames are received from the access point after the sleep notification is sent. Accordingly, the streaming device 420 may remain in an awake state after sending the sleep notification in some instances to monitor for frames or data from the access point 420. In some embodiments, the WiFi system of the streaming device 420 may remain in an awake state for a predetermined number of beacon intervals after sending the sleep notification, and may determine or otherwise detect if the access point 420 sends the streaming device 410 any data. In some embodiments, the streaming device 410 may determine whether the access point 420 sends a threshold number of frames or packets while the streaming device 410 is supposed to be in a sleep state or during an unscheduled wake period. In some embodiments, the streaming device 410 may perform operation 426 a number of times or iteratively to determine whether the access point 420 consistently sends data to the streaming device 410 while the streaming device 410 is supposed to be in a sleep state. Accordingly, a determination of whether or not data is received after sending the sleep notification may be made more than once to determine whether the access point consistently sends data to the streaming device 410 while the streaming device 410 is supposed to be in a sleep state.

In some embodiments, the streaming device 410 may send a sleep notification to the access point 420 indicating that the streaming device 410 will enter a sleep state for a first length of time. The first length of time may be determined based at least in part on an amount of data that is to be communicated by another radio, such as a Bluetooth radio, medium utilization, an active protocol, and/or other factors.

If it is determined that data is received after sending the sleep notification at operation 426, the access point 420 may be determined to be non-compliant. The data and process flow 400 may proceed to a non-compliant process flow 428. If the access point 420 is determined to be non-compliant, the streaming device 410 may send a medium reservation request to the access point 420 at a fourth operation 430. For example, the streaming device 410 may send a request to send frame to the access point 420, which may indicate that the streaming device 410 intends to send data to the access point 420. The request to send frame or other medium reservation request may include a time value that is requested by the streaming device 410 for sending the data.

The access point 420 may receive the medium reservation request and may, at a fifth operation 432, send an approval message to the streaming device 410. The approval message may be an acknowledgment or other message, and may include a time value indicating an amount of time that is reserved for the streaming device 410 to send data to the access point 420. The time value may be the same as that requested by the streaming device 410, if applicable, or may be determined by the access point 420. During the time value or time period reserved for the streaming device 410 to send data to the access point 420, the access point 420 may not send data to, or in some instances communicate with, the streaming device 410 or other connected devices in the network.

The streaming device 410 may receive the approval message from the access point 420, and at a sixth operation 434, the streaming device 410 may communicate (e.g., transmit and/or receive) the Bluetooth data using a first antenna. A second antenna may remain idle while the Bluetooth data is communicated. After the Bluetooth data communication is complete, at a seventh operation 436, the streaming device 410 may communicate WiFi data using the first antenna and a second antenna. Because the access point 420 was expecting the WiFi data during the medium reservation time, there may have not been any data sent to the WiFi radio from the access point 420 during the medium reservation time, which may therefore allow the Bluetooth communication to be completed without interference from the WiFi radio and/or access point 420.

Reserving medium at the access point 420 for lengths of time may impact overall network performance, as the access point 420 may reduce or pause communications with other devices connected to the access point 420. Accordingly, some embodiments may track an amount of medium utilization at the access point 420 that is attributable to the streaming device 410. For example, during a connection session, the streaming device 410 may determine an amount of medium of the access point 410 used by or attributable to the streaming device 410, and may determine subsequent requested lengths of time based at least in part on the amount of medium utilization. For example, after a certain amount of utilization, the streaming device 410 may reduce the amount of reserved time or number of reservation requests sent to the access point 420, so as to limit impact to performance of the access point 320 and/or other connected devices.

In some embodiments, the medium reservation request sent by the streaming device 410 may request to block or reserve only a certain channel, such as a channel with a bandwidth of 20 MHz, to reduce impact to the overall network. By sleeping, the power consumption of the streaming device 410 may be reduced as a result of sleeping receive antennas instead of listening.

If it is determined that data is not received after sending the sleep notification at operation 426, the access point 420 may be determined to be compliant. The data and process flow 400 may continue to a compliant access point data and process flow 440. Compliant access points may buffer traffic for sleeping devices while the devices are in sleep states. Accordingly, at an eighth operation 442, the access point 420 may buffer data for the streaming device 410 after receiving the sleep notification at the second operation 424. At a ninth operation 444, the streaming device 410 may communicate (e.g., transmit and/or receive) the Bluetooth data using a first antenna. A second antenna may remain idle while the Bluetooth data is communicated. After the Bluetooth data communication is complete, At an optional tenth operation 446, the streaming device 410 may send a poll frame to the access point 420. The poll frame may indicate that the streaming device 410 is in an awake state and may be a request for any buffered data for the streaming device 410 at the access point 420.

At an eleventh operation 448, the access point 420 may send the buffered data to the streaming device 410. The buffered data may be sent at a predetermined wakeup time, which may be based on protocol. For example, beacons may be used to wake up the streaming device 410, or the streaming device 410 may wake up at a predetermined beacon interval to receive a beacon.

At a twelfth operation 450, the streaming device 410 may communicate WiFi data using the first antenna and a second antenna. Because the access point 420 was compliant and not communicating with the streaming device 410 during the sleep duration, there may have not been any data sent to or received by the WiFi radio from the access point 420 during the sleep time, which may therefore allow the Bluetooth communication to be completed without interference from the WiFi radio and/or access point 420.

FIG. 5 is a schematic illustration of an example process flow 500 for using shared antennae for multi-protocol communication in accordance with one or more example embodiments of the disclosure. In the example of FIG. 5, a first wireless radio, such as a WiFi radio, may request to transmit data, while a second wireless radio, such as a Bluetooth radio, may request to concurrently, or at least partially concurrently, receive data.

While example embodiments of the disclosure may be described in the context of WiFi and/or Bluetooth communications and radios, it should be appreciated that the disclosure is more broadly applicable to any type of electronic device and/or communication protocol. Some or all of the blocks of the process flows in this disclosure may be performed in a distributed manner across any number of devices. The operations of the process flow 500 may be optional and may be performed in a different order.

At block 502, a request from a WiFi radio may be determined, where the request is to transmit first data. For example, one or more modules at a device may determine and/or receive a request to transmit first data, where the request is from a WiFi radio. The request may include a data transmission duration that represents a length of time for transmission of the first data, or a data transmission size indicating an amount of data that is to be transmitted. For example, the WiFi radio may request to use one or more antennas of the device for a data transmission duration of 15 milliseconds during which the first data is to be received, or to send 1 megabyte of data. The request may include a start time of the request (e.g., the first data may be transmitted starting in 5 milliseconds for a duration of 15 milliseconds, the first data may be received at 06:52:12 am for a duration of 15 milliseconds, etc.). In some embodiments, the request may include (i) a first data transmission duration representing a length of time to transmit the first data, and (ii) an indication of whether one or two antennas are requested for transmission of the first data.

At block 504, a request from a Bluetooth radio may be determined, where the request is to receive second data. The request may be determined before the first data is transmitted. For example, one or more modules at the device may determine and/or receive a request to receive second data, where the request is from a Bluetooth radio. The request may be received prior to transmission of the first data. For example, the request may be received before the first data is transmitted or partially transmitted, or before transmission of the first data is initiated.

The request may include a data reception duration that represents a length of time for reception of the second data. The data reception duration may be protocol-specific, such as a scheduled Bluetooth data transmission or reception interval. In an example, the Bluetooth radio may request to use one or more antennas of the device for a data reception duration of 5 milliseconds during which the second data is to be received. The request may include a start time of the request (e.g., the second data may be received starting in 5 milliseconds for a duration of 10 milliseconds, the second data may have a start time or initiation time at 06:52:12 am for a duration of 15 milliseconds, etc.). Accordingly, concurrent or partially concurrent use of the antennas at the device may be desired by the WiFi radio and the Bluetooth radio.

At block 506, a first signal strength associated with the WiFi radio may be determined. For example, one or more modules at the device may query a system or component at the device or at a connected device to determine a signal strength associated with the WiFi radio. For example, the device may determine a strength of a signal associated with a WiFi connection to a particular access point or set of devices. The signal strength may be determined, in an example, using a received signal strength indicator that represents the strength of the wireless signal received at the device. In some embodiments, signal strength may be determined using one or more of receive gain, transmit/broadcast power, and the like.

At block 508, a second signal strength associated with the Bluetooth radio may be determined. For example, one or more modules at the device may query a system or component at the device or at a connected device to determine a signal strength associated with the Bluetooth radio. For example, the device may determine a strength of a signal associated with a Bluetooth connection to a particular device, or set of devices. The signal strength may be determined, in an example, using a received signal strength indicator that represents the strength of the wireless signal received at the device. In some embodiments, signal strength may be determined using one or more of receive gain, transmit/broadcast power, and the like.

At determination block 510, a determination may be made as to whether the respective signal strengths are greater than or equal to the respective first threshold(s). For example, one or more modules at the device may be configured to determine whether the first signal strength and/or the second signal strength is greater than or equal to a first threshold. The first threshold may include one or more values. For example, the first threshold may be a percentage value, such as 80%. In this instance, the first signal strength and the second signal strength may be compared to the first threshold value of 80% to determine whether the respective signal strengths are greater than or equal to the 80% threshold. In some embodiments, only one of the signal strengths may have to satisfy the first threshold for a positive determination at block 510, while in other embodiments, both of the signal strengths may have to satisfy the first threshold for a positive determination at block 510. In other embodiments, the first threshold may have different values for the respective signal strengths. For example, the first threshold may have a value of 80% for the WiFi signal strength and a 75% value for the Bluetooth signal strength. In other embodiments, the first threshold may be other values, such as −50 dbm for WiFi and/or −30 dbm for Bluetooth, etc.

The first threshold may be static or dynamic. For example, the first threshold may be stored in a lookup table and may be determined using one or more empirical values, such as parametric values (e.g., part to part values determined in or near real-time, etc.). The first threshold may represent isolation through a coupler (e.g., received signal strength indicator values, etc.) and may be design-specific for different devices.

If it is determined at determination block 510 that the respective signal strengths are greater than or equal to the respective first threshold(s), the process flow 500 may proceed to block 512. At block 512, the Bluetooth radio may be caused to be coupled to a first antenna. For example, the device may cause the Bluetooth radio to be coupled to a first antenna of the device. To couple the Bluetooth radio to the device, the device may cause one or more switches, such as a single pole double throw switch in one example, to electrically couple the Bluetooth radio path to the first antenna. The switch may be switched from a termination resistance and/or resistor to the Bluetooth path.

At optional block 514, the Bluetooth transmit power and/or WiFi receive gain parameters may be set. For example, the device may be configured to set one or more parameters, such as a Bluetooth transmit power and/or WiFi receive gain parameters to facilitate data communication. Because of the positive determination at block 510, both the request at block 502 and the request at block 504 may be granted, for concurrent or partially concurrent use of the antennas of the device. Accordingly, at the optional block 514, the parameters may be set to facilitate the WiFi radio transmission of the first data and/or the Bluetooth radio receipt of the second data.

At block 516, the WiFi radio may be caused to transmit the first data using the first antenna and the second antenna, and the Bluetooth radio may be caused to concurrently or partially concurrently receive the second data using the first antenna. For example, the device (e.g., an arbiter module(s)

at the device, etc.) may permit the WiFi radio to transmit the first data using both of the antennas at the device, while the Bluetooth radio receives the second data using the first antenna at least partially concurrently as the WiFi radio uses the first antenna. As a result, the system may perform in an optimized manner, although two antennas are being used, at least one of which is shared between the Bluetooth radio and the WiFi radio.

If it is determined at determination block 510 that the respective single strengths are not greater than or equal to the respective first threshold(s), the process flow 500 may proceed to determination block 518. For example, the device may determine that the Bluetooth signal strength is not greater than or equal to the first threshold and/or the WiFi signal strength is not greater than or equal to the first threshold. In some embodiments, one of the signal strengths may be less than (or equal to, which could be the case in some embodiments) the threshold, while in other embodiments, both of the signal strengths may be less than (or equal to, which could be the case in some embodiments) the threshold.

At determination block 518, a determination may be made as to whether more than one spatial stream or multiplexing is needed to transmit the first data. Spatial streams are streams that can pack a certain amount of data, and multiple spatial streams allow an access point to send independent streams of data, thereby allowing for an increase in the amount of data that can be communicated simultaneously. Multiple spatial streams may be communicated at the same time using different antenna, and may include independent and separately encoded data. Communication such as 2×2:2, may indicate that there are 2 antennas available for transmission, 2 antennas available for receiving, and the device is able to handle 2 spatial streams.

For example, one or more modules at the device may be configured to determine whether the first data transmission is a 1×1 transmission, which may indicate that one antenna is used to transmit the first data. If the transmission uses one antenna at the device, the determination may be negative. If the transmission does not use one antenna, or uses more than one antenna, such as in instances where the transmission is a 2×2 or 2×3 transmission (where two antennas are used to transmit the first data, and two or three antennas are used to receive the first data at the access point, etc.), the determination at determination block 518 may be positive. To determine a number of spatial streams need to transmit the first data, the one or more modules may determine, in one example, an mcs field of a radiotap header. In one example, the device may determine that two antennas are requested to transmit the first data based at least in part on the request received from the WiFi radio.

If it is determined at determination block 518 that no more than one spatial stream (e.g., a single spatial stream) is needed to transmit the first data and/or that one antenna is needed to transmit the first data, the process flow 500 may proceed to determination block 526.

At determination block 526, a determination may be made as to whether the respective signal strengths are greater than or equal to respective second threshold(s). For example, one or more modules at the device may be configured to determine whether the first signal strength and/or the second signal strength is greater than or equal to a second threshold. The second threshold may include one or more values. For example, the first threshold may be a percentage value, such as 60%. In this instance, the first signal strength and the second signal strength may be compared to the second threshold value of 60% to determine whether the respective signal strengths are greater than or equal to the 60% threshold. In some embodiments, only one of the signal strengths may have to satisfy the second threshold for a positive determination at block 526, while in other embodiments, both of the signal strengths may have to satisfy the second threshold for a positive determination at block 526. In other embodiments, the second threshold may have different values for the respective signal strengths. For example, the second threshold may have a value of 50% for the WiFi signal strength and a 55% value for the Bluetooth signal strength. In other embodiments, the first threshold may be other values, such as −50 dbm for WiFi and/or −30 dbm for Bluetooth, etc.

The second threshold may be static or dynamic. For example, the second threshold may be stored in a lookup table and may be determined using one or more empirical values, such as parametric values (e.g., part to part values determined in or near real-time, etc.). The second threshold may represent isolation between the two antennas of the device (e.g., simultaneous transmission and reception, etc.) and may be different for each signal strength. The second threshold may be design-specific for different devices. The second threshold may be modified by physically separating the two antennas of the device, such as increasing physical separation distance, adjusting placement of the antennas within the device, using different antenna materials, and so forth. The greater the isolation, the increased likelihood of successful simultaneous transmission and reception of data.

If it is determined at determination block 526 that the respective signal strengths are greater than or equal to the respective second threshold(s), the process flow 500 may proceed to block 528. At block 528, the Bluetooth radio may be caused to receive the second data using a first antenna, and the WiFi radio may be caused to concurrently or partially concurrently transmit the first data using a second antenna. Accordingly, as a result of the positive determination at block 526, the WiFi and Bluetooth radios may share use of the device antennas. For example, the device (e.g., an arbiter module(s) at the device, etc.) may permit the WiFi radio to transmit the first data using the second antenna at the device, while the Bluetooth radio receives the second data using the first antenna at least partially concurrently as the WiFi radio uses the second antenna. As a result, the system may perform in an optimized manner, although two antennas are being used, at least one of which is shared between the Bluetooth radio and the WiFi radio. To permit use of the first antenna by the Bluetooth radio, the device may optionally cause the Bluetooth radio to be coupled to the first antenna using one or more switches. For example, the switch may be switched from a termination resistance and/or resistor to the Bluetooth path.

If it is determined at determination block 518 that more than one spatial stream (e.g., a plurality of spatial streams, etc.) is needed to transmit the first data and/or that more than one antenna is needed to transmit the first data, the process flow 500 may proceed to determination block 520. Similarly, if it is determined at determination block 526 that the respective signal strengths are not greater than or equal to the respective second thresholds, the process flow may proceed to determination block 520.

Because the determination at block 518 is positive, and/or because the determination at determination block 526 is negative, the Bluetooth reception and the WiFi transmission may not be able to occur concurrently, because the resultant communications may be interrupted or interfered with by each other, and/or a connected access point may drop a transmission rate, which may negatively impact a user experience of the device.

At determination block 520, a determination may be made as to whether Bluetooth communication is prioritized over WiFi communication, or whether WiFi communication is prioritized over Bluetooth communication. For example, one or more modules of the device may be configured to determine whether Bluetooth communication is prioritized over WiFi communication, or whether WiFi communication is prioritized over Bluetooth communication.

In some embodiments, priority order may be determined using a lookup table, while in other embodiments, priority order may be determined in real time. For example, based at least in part on active applications or applications that are actively being used at the device, priority order may change. For example, if a user is using the device for playback of music at a Bluetooth speaker, Bluetooth communication may be prioritized over WiFi communication. This may be because the Bluetooth communication directly impacts a user experience with the music playback, and if the WiFi communication is to determine whether there are any new messages for a user account on the device, the WiFi communication may not be as high of a priority relative to the Bluetooth communication. Other factors, such as buffer levels, time of connection or session, and/or other factors may be used to determine a priority order. In the example of FIG. 5, the device may determine, using a priority table, whether the Bluetooth communication is prioritized over the WiFi communication.

If it is determined at determination block 520 that Bluetooth communication is prioritized over WiFi communication, the process flow 500 may proceed to block 522. At block 522, the Bluetooth radio may be caused to receive the second data using a first antenna, while a second antenna of the device is held idle or remains unused. The second antenna may remain idle during the data reception duration, or while the Bluetooth radio receives the second data. Accordingly, as a result of a positive determination at block 520, the Bluetooth radio may be caused to receive the second data while the WiFi radio communication is delayed. After the Bluetooth communication is complete, the Bluetooth radio may be decoupled from the first antenna, and the WiFi radio may be caused to transmit a first portion, or all, of the first data using the first antenna and the second antenna.

If it is determined at determination block 520 that Bluetooth communication is not prioritized over WiFi communication, the process flow 500 may proceed to block 524. At block 524, the WiFi radio may be caused to transmit the first data using the first antenna and the second antenna of the device. For example, the device (e.g., an arbiter module(s) at the device, etc.) may permit the WiFi radio to transmit the first data using the first antenna and the second antenna at the device, while the Bluetooth communication is delayed, and may be completed after the WiFi communication is complete. In some embodiments, the Bluetooth radio may be decoupled from the first antenna while the WiFi radio transmits the first data (e.g., a switch may be coupled to a resistor instead of the Bluetooth radio, etc.).

By implementing the process flow 500, a first wireless radio, such as the WiFi radio, may transmit first data, while a second wireless radio, such as the Bluetooth radio, may receive data. The performance of a two-antenna system implementing the process flow 500 may be comparable to, or improved over, the performance of a three-antenna system performing the same operations.

In some embodiments, there may be an amount of time before a Bluetooth communication or other schedule-based protocol communication is scheduled to occur. For example, the Bluetooth radio may indicate that data is expected to be received in 15 milliseconds. In such instances, the device (e.g., the arbiter module(s), etc.) may allow the WiFi radio to use one or both of the device antennas for the WiFi communication before the Bluetooth communication is initiated. This may be in instances where Bluetooth communication is prioritized over WiFi communication (e.g., positive determination at block 520, etc.). For example, the device may determine an amount of time before the Bluetooth or other data reception duration is scheduled to begin. The device may determine whether the WiFi communication has a data transmission duration that is longer than the amount of time (e.g., WiFi radio desires to transmit for 20 milliseconds while amount of time to initiation is 15 milliseconds, etc.). The device may cause the WiFi radio to transmit a portion of the data using the first antenna and the second antenna for the amount of time, or before the Bluetooth communication is initiated.

Figure 6:
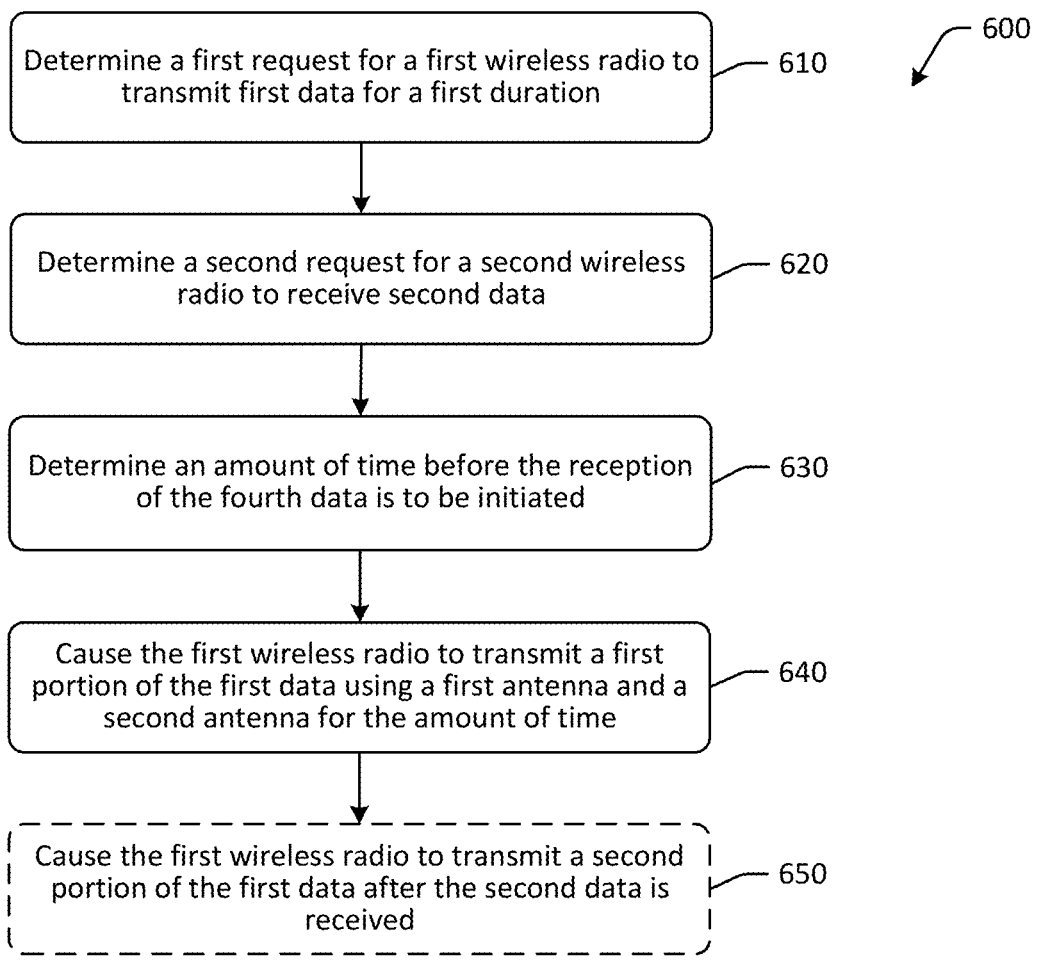
FIG. 6 is a schematic illustration of an example process flow for using shared antennas for multi-protocol communication in accordance with one or more example embodiments of the disclosure.

FIG. 6 depicts an example process flow 600 for using shared antennas for multi-protocol communication in accordance with one or more example embodiments of the disclosure. The process flow 600 may be used, for example, to determine whether a partial communication can occur for a communication protocol that is prioritized behind another communication protocol in instances where the prioritized communication protocol may have an upcoming scheduled communication. For example, Bluetooth communication may be prioritized over WiFi communication, and an upcoming Bluetooth communication may be scheduled to occur in 5 milliseconds. If needed, the WiFi radio may be permitted to communicate using one or both antennas at a device for the 5 millisecond interval, and then one of the antennas may be coupled to the Bluetooth radio (and the other optionally held idle) when the scheduled Bluetooth communication commences. After the Bluetooth communication is complete, the WiFi communication may resume.

While example embodiments of the disclosure may be described in the context of WiFi and/or Bluetooth communications and radios, it should be appreciated that the disclosure is more broadly applicable to any type of electronic device and/or communication protocol. Some or all of the blocks of the process flows in this disclosure may be performed in a distributed manner across any number of devices. The operations of the process flow 600 may be optional and may be performed in a different order.

At block 610 of the process flow 600, computer-executable instructions stored on a memory of a device, such as a remote server or a content streaming device, may be executed to determine a first request for a first wireless radio to transmit first data for a first duration. For example, a content streaming device may receive a first request from a WiFi radio for the WiFi radio to transmit first data. The request may include a transmission length of time or the first duration during which the WiFi radio desires to transmit the first data. In another example, the WiFi radio may desire to receive first data for the first duration.

At block 620 of the process flow 600, computer-executable instructions stored on a memory of a device may be executed to determine a second request for a second wireless radio to receive second data. For example, the content streaming device may receive a second request from a Bluetooth radio for the Bluetooth radio to receive second data. The request may indicate that the second data is to be received at a scheduled time. For example, Bluetooth protocol may include schedule-based communications, where certain communications occur at predetermined times or intervals. For example, the Bluetooth radio may request to receive the second data in 10 milliseconds. The request may optionally include a duration during which the second data is to be received, such as 5 milliseconds. In another example, the Bluetooth radio may desire to transmit second data instead of receive second data.

At block 630 of the process flow 600, computer-executable instructions stored on a memory of a device may be executed to determine an amount of time before the reception of the second data is to be initiated. For example, the second request may indicate that the second data is to commence or be initiated in 10 milliseconds. In some embodiments, a time of initiation may be included in the request from the Bluetooth radio. An amount of time may be determined by the streaming device using the information from the request, and/or may be calculated based at least in part on a predetermined communication schedule or protocol-specific data.

At block 640 of the process flow 600, computer-executable instructions stored on a memory of a device may be executed to cause the first wireless radio to transmit a first portion of the first data using a first antenna and a second antenna of the device for the amount of time. For example, because there is a period of time before the Bluetooth radio is to receive the second data, the WiFi radio may be permitted to send the first portion of the first data using one or both of the first antenna and/or the second antenna for the amount of time. After the amount of time elapses, the Bluetooth radio may be permitted to receive the second data using one of the antennas, while the other may optionally be held in an idle state.

In this example, Bluetooth communications may be prioritized over WiFi communications. In other examples, WiFi communications may be prioritized over Bluetooth communications. In such instances, the WiFi communication may be permitted to complete prior to the Bluetooth communication being initiated.

At optional block 650 of the process flow 600, computer-executable instructions stored on a memory of a device may be executed to cause the first wireless radio to transmit a second portion of the first data after the second data is received. For example, the content streaming device may receive the second data using the Bluetooth radio during the scheduled Bluetooth data transmission interval. After the second data is received and/or after the scheduled interval elapses, the WiFi radio may be permitted to continue sending the first data. Permitting the WiFi radio and/or the Bluetooth radio to transmit and/or receive data may include causing a switch to couple or decouple the WiFi radio and/or Bluetooth radio to one of the antennas of the system.

Figure 7:
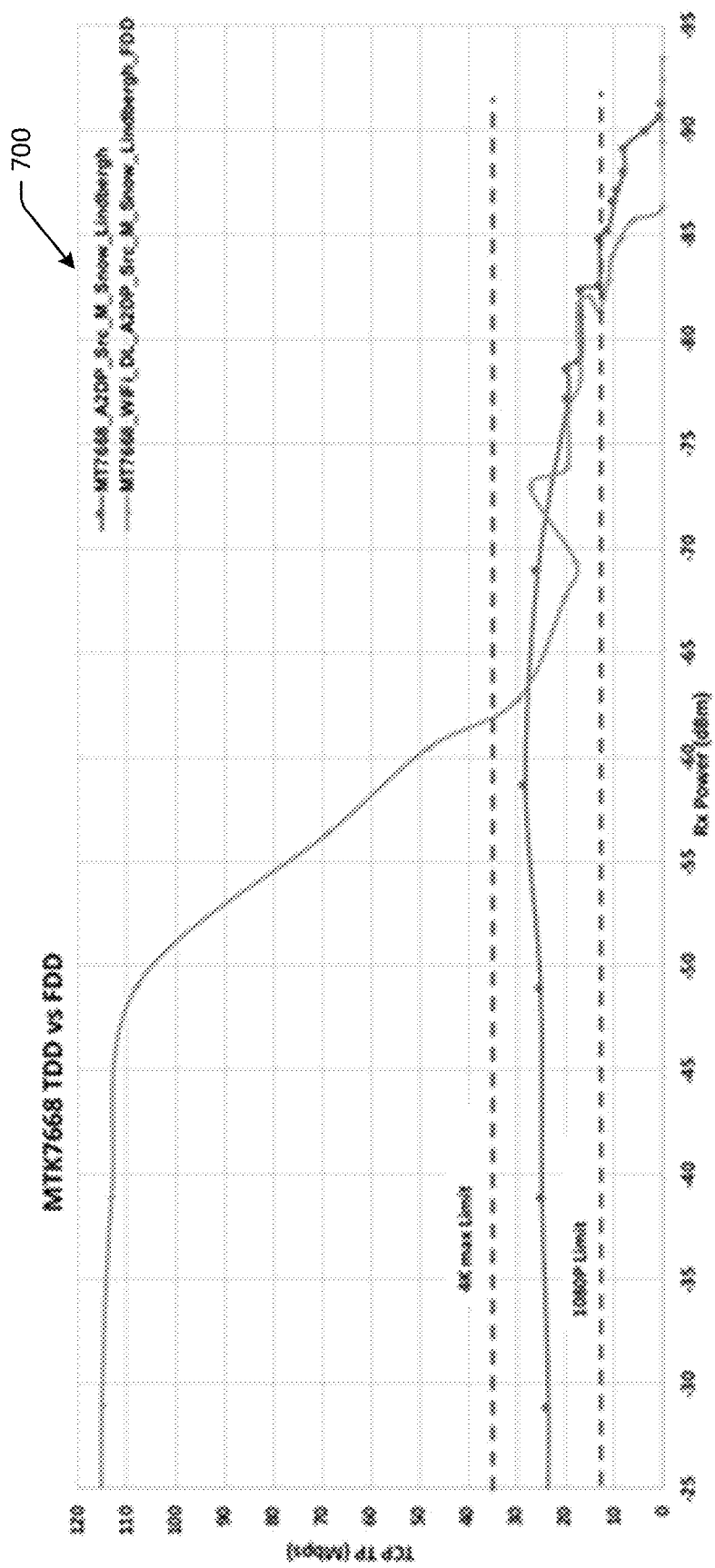
FIG. 7 is an example graph illustrating performance of frequency division duplex (FDD) and time division duplex (TDD) couplers in accordance with one or more example embodiments of the disclosure.

FIG. 7 is an example graph 400 illustrating performance of frequency division duplex (FDD) and time division duplex (TDD) couplers. As illustrated, TDD cannot meet the certain coex use cases—e.g., 3 paired Bluetooth devices (speaker+2 accessories), while Hybrid coex can, as shown by the measurements in the graph 400.

A determination may be made if a) this use case is required for the 2.4 GHz band, b) if the complexity adder of the Hybrid implementation is needed. Some embodiments may enable hybrid without adding a third 2.4 GHz antenna. In one example, embodiments may reuse a 5 GHz antenna as a dual band antenna for Bluetooth. In another example, embodiments may include a directional coupler. The directional coupler approach is discussed above with respect to FIG. 1.

Figure 8:
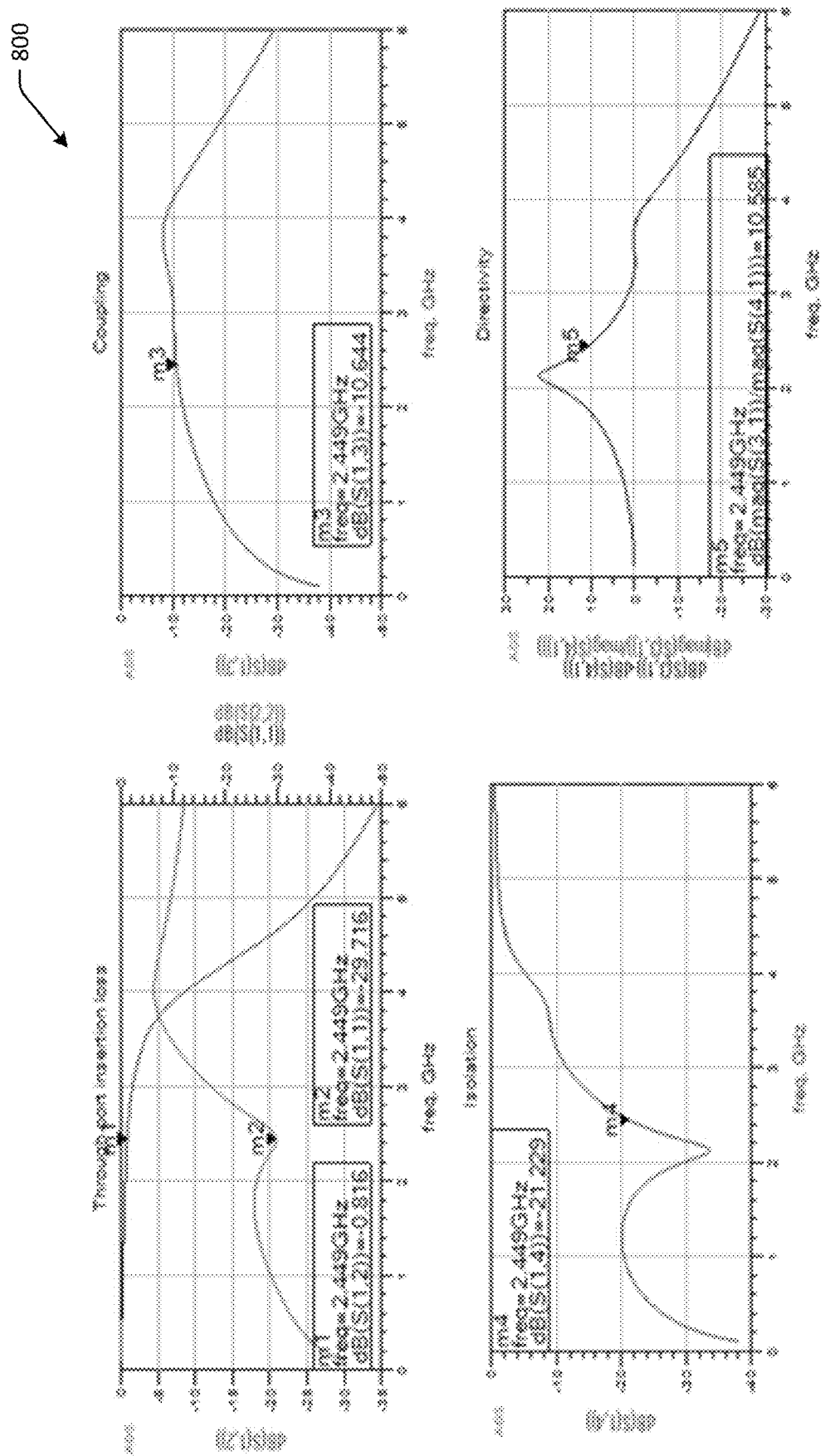
FIG. 8 are example graphs illustrating simulated coupler performance in accordance with one or more example embodiments of the disclosure.

FIG. 8 illustrates simulated coupler performance in accordance with one or more example embodiments of the disclosure. For example, graphs 800 of through port insertion loss, coupling, isolation, and directivity are illustrated.

Figure 9:
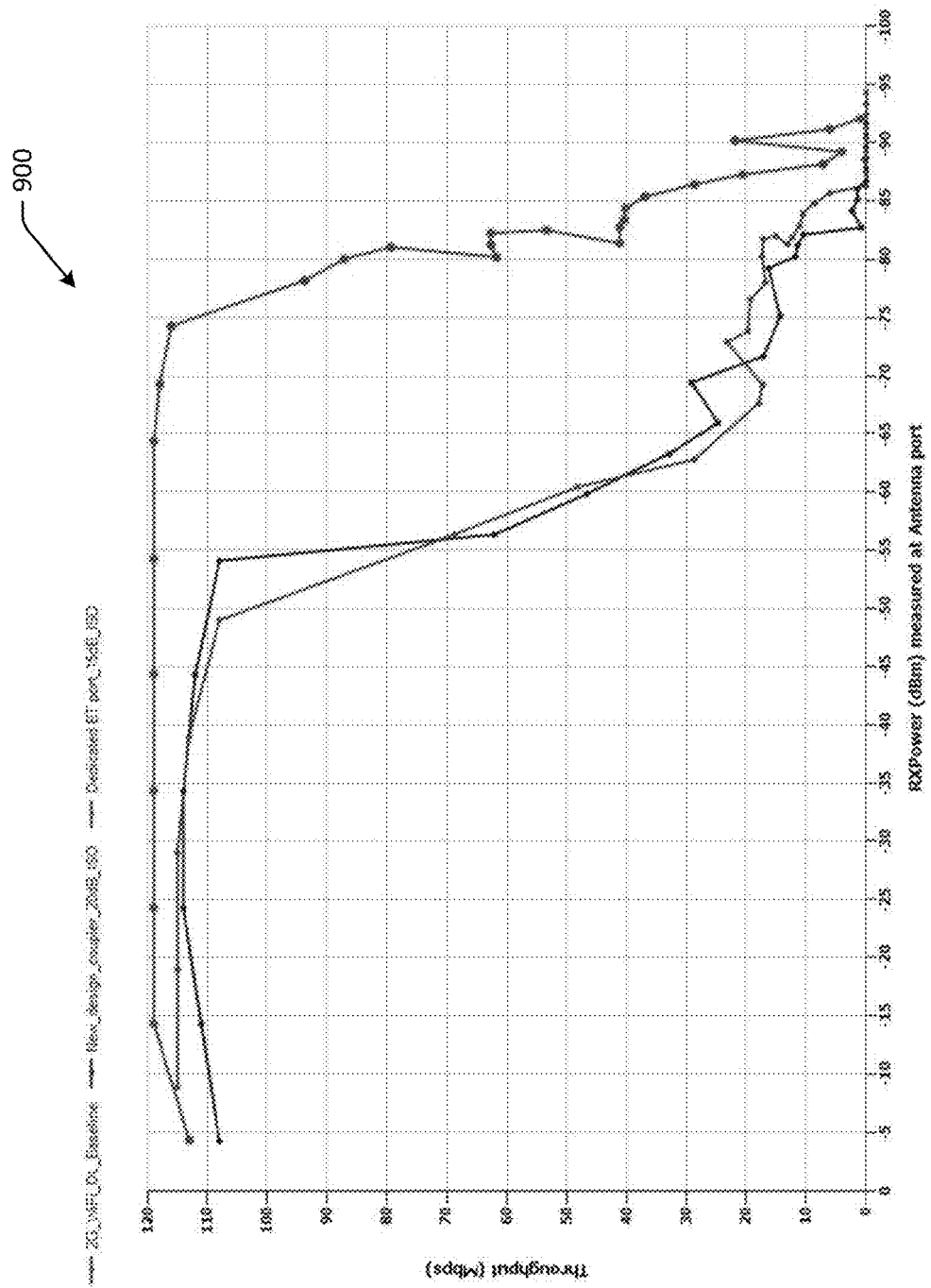
FIG. 9 is an example graph illustrating throughput versus receive power measured at an antenna port in accordance with one or more example embodiments of the disclosure.

FIG. 9 is an example graph 900 illustrating throughput of various couplers (versus receive power measured at an antenna port) in accordance with one or more example embodiments of the disclosure. As illustrated, throughput may be improved with embodiments of the disclosure.

Certain embodiments may include an optional protection circuit for Bluetooth when WiFi is transmitting. Certain embodiments may modify the allowed concurrency modes of Bluetooth/WiFi when the coupler is used. Certain embodiments may implement WiFi rate protection when Bluetooth transmission is concurrently operating by use of a protection frame.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 10:
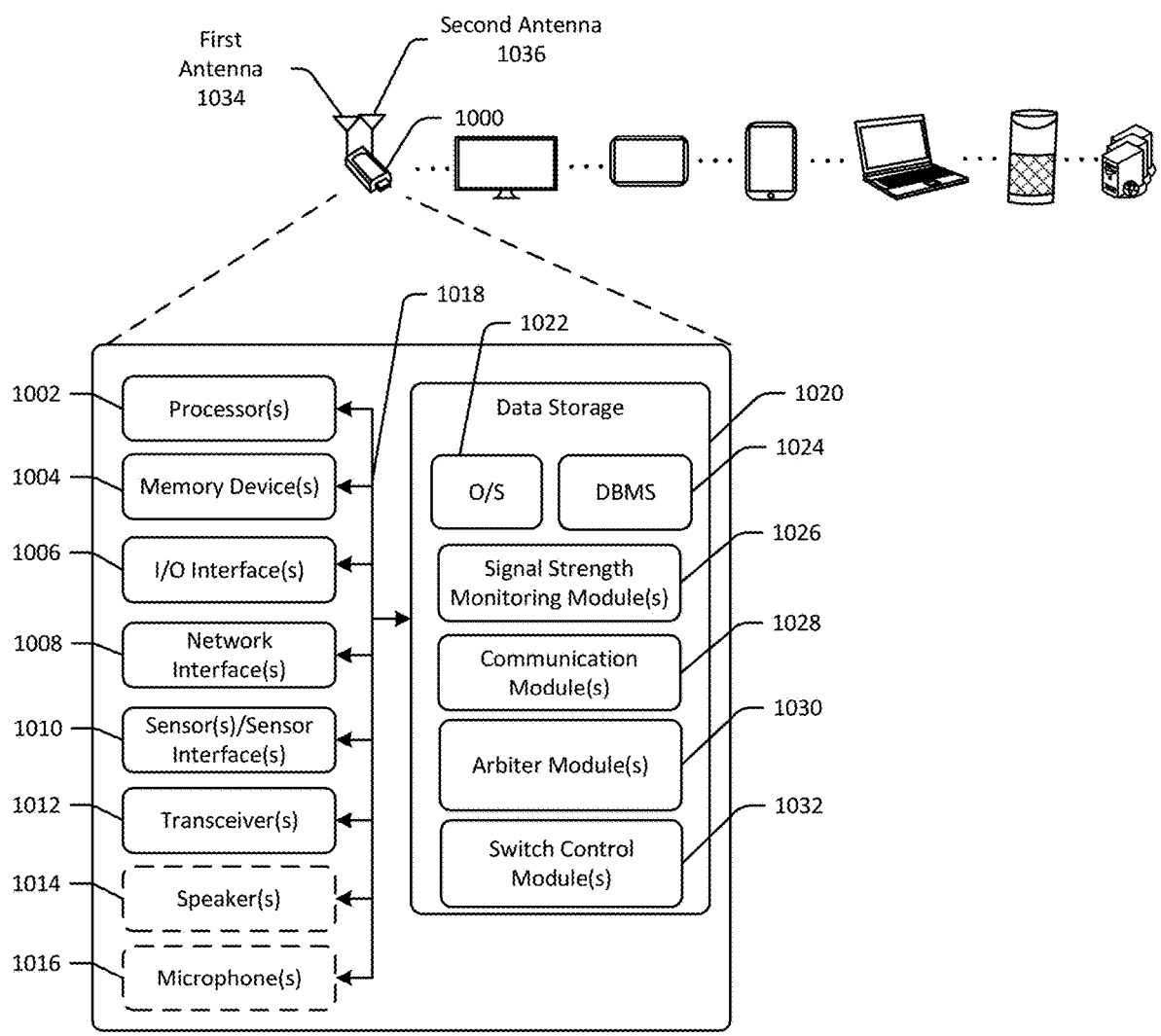
FIG. 10 is a schematic block diagram of an illustrative device in accordance with one or more example embodiments of the disclosure.

FIG. 10 is a schematic block diagram of an illustrative electronic device 1000 in accordance with one or more example embodiments of the disclosure. The electronic device 1000 may include any suitable computing device capable of receiving data and/or streaming content including, but not limited to, a content streaming device, a television, a mobile device such as a smartphone, tablet, e-reader, wearable device, or the like; a desktop computer; a laptop computer; a content streaming device; a set-top box; or the like. The electronic device 1000 may correspond to an illustrative device configuration for the devices of FIGS. 1-9.

The electronic device 1000 may be configured to communicate via one or more networks with one or more servers, televisions or other displays, user devices, or the like. In some embodiments, a single content streaming device or single group of streaming device and/or servers may be configured to perform more than one type of shared antenna management and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device 1000 may include one or more processors (processor(s)) 1002, one or more memory devices 1004 (generically referred to herein as memory 1004), one or more input/output (I/O) interface(s) 1006, one or more network interface(s) 1008, one or more sensors or sensor interface(s) 1010, one or more transceivers 1012, one or more optional speakers 1014, one or more optional microphones 1016, and data storage 1020.

The electronic device 1000 may further include one or more buses 1018 that functionally couple various components of the electronic device 1000. The electronic device 1000 may further include one or more antenna(s), such as a first antenna 1034 and/or a second antenna 1036 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the electronic device 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the electronic device 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like such as, for example, one or more signal strength monitoring module(s) 1026, one or more communication module(s) 1028, one or more arbiter module(s) 1030, and/or one or more switch control module(s) 1032. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the electronic device 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, historical thermal data, network connection data, performance changes due to mitigation techniques, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the electronic device 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the signal strength monitoring module(s) 1026 may include computer-executable instructions, code, or the like that responsive to execution by one or more of the processor(s) 1002 may perform functions including, but not limited to, determining signal strengths of one or more connections and/or communication protocols, determining signal strength indicator values, determining respective threshold values, using lookup tables to determine threshold values, comparing one or more signal strength values to threshold values, monitoring signal strengths of various wireless or wired connections, and so forth.

The communication module(s) 1028 may include computer-executable instructions, code, or the like that responsive to execution by one or more of the processor(s) 1002 may perform functions including, but not limited to, communicating with one or more devices, for example, via wired or wireless communication, communicating with remote servers, communicating with remote servers, streaming data, sending or receiving notifications or alerts, communicating with cache memory data, and the like.

The arbiter module(s) 1030 may include computer-executable instructions, code, or the like that responsive to execution by one or more of the processor(s) 1002 may perform functions including, but not limited to, determining priority of communications, determining requests for communication, including transmissions and receptions of data, determining an order of communications, granting communication requests, gating and/or preventing certain communications, causing communications to be transmitted or received, permitting access to one or more antenna(s), and the like.

The switch control module(s) 1032 may include computer-executable instructions, code, or the like that responsive to execution by one or more of the processor(s) 1002 may perform functions including, but not limited to, causing a switch to couple and/or decouple one or more transceivers or radios from one or more antennas, and the like.

Referring now to other illustrative components depicted as being stored in the data storage 1020, the O/S 1022 may be loaded from the data storage 1020 into the memory 1004 and may provide an interface between other application software executing on the electronic device 1000 and hardware resources of the electronic device 1000. More specifically, the O/S 1022 may include a set of computer-executable instructions for managing hardware resources of the electronic device 1000 and for providing common services to other application programs (e.g., managing memory allocation among various application programs). In certain example embodiments, the O/S 1022 may control execution of the other program module(s) to dynamically enhance characters for content rendering. The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device 1000 is a mobile device, the DBMS 1024 may be any suitable light-weight DBMS optimized for performance on a mobile device.

Referring now to other illustrative components of the electronic device 1000, the input/output (I/O) interface(s) 1006 may facilitate the receipt of input information by the electronic device 1000 from one or more I/O devices as well as the output of information from the electronic device 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(s) 1034, 1036 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The electronic device 1000 may further include one or more network interface(s) 1008 via which the electronic device 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(s) 1034, 1036 may include any suitable type of antenna depending, for example, on the communications protocols used to transmit or receive signals via the antenna(s) 1034, 1036. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 1034, 1036 may be communicatively coupled to one or more transceivers 1012 or radio components to which or from which signals may be transmitted or received.

As previously described, the antenna(s) 1034, 1036 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1034, 1036 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 1034, 1036 may be configured to transmit or receive radio frequency signals within any suitable frequency range forming part of the unlicensed portion of the radio spectrum.

The antenna(s) 1034, 1036 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(s) 1034, 1036—transmitting or receiving radio frequency (RF) signals in the bandwidth and/or channels corresponding to the communications protocols utilized by the electronic device 1000 to communicate with other devices. The transceiver(s) 1012 may include hardware, software, and/or firmware for modulating, transmitting, or receiving—potentially in cooperation with any of antenna(s) 1034, 1036—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the electronic device 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1014 may be any device configured to generate audible sound. The optional microphone(s) 1016 may be any device configured to receive analog sound input or voice data.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the electronic device 1000 may include alternate and/or additional hardware, software, or firmware components beyond those described or depicted without departing from the scope of the disclosure. More particularly, it should be appreciated that software, firmware, or hardware components depicted as forming part of the electronic device 1000 are merely illustrative and that some components may not be present or additional components may be provided in various embodiments. While various illustrative program module(s) have been depicted and described as software module(s) stored in data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method for managing communications between a user device, a Bluetooth device, and an access point, the method comprising:
   receiving, by the user device, a first request from a WiFi radio of the user device to transmit first data to the access point, the first request comprising (i) a first data transmission duration representing a length of time allocated to transmit the first data, and (ii) an indication that two antenna(s) are requested for transmission of the first data;
   receiving, by the user device and prior to transmission of the first data, a second request from a Bluetooth radio of the user device to receive second data from the Bluetooth device, the second request comprising a first data reception duration representing a length of time allocated to receive the second data;
   determining that a Bluetooth signal strength between the user device and the Bluetooth device is less than or equal to a first threshold, wherein the first threshold represents a signal strength at which concurrent communication can occur;
   determining that a first amount of data in a Bluetooth buffer of the user device is less than a second amount of data in a WiFi buffer of the user device;
   causing a switch to electrically couple the Bluetooth radio to a first antenna, wherein the Bluetooth radio is decoupled from the first antenna, and the WiFi radio is coupled to a second antenna in a default configuration of the user device;
   causing the Bluetooth radio to receive the second data using the first antenna;
   causing the second antenna to remain idle during the first data reception duration, wherein the second antenna does not transmit or receive data while idle;
   causing the switch to decouple the Bluetooth radio from the first antenna; and
   causing the WiFi radio to transmit a first portion of the first data using the first antenna and the second antenna after the first data reception duration elapses.

2. The method of claim 1, further comprising:
   receiving a third request from the WiFi radio to receive third data, the third request comprising a second data reception duration representing a length of time to receive the third data;
   receiving, prior to reception of the third data, a fourth request from the Bluetooth radio to transmit fourth data, the fourth request comprising a second data transmission duration representing a length of time to transmit the fourth data;
   determining that the Bluetooth signal strength is less than or equal to the first threshold;
   determining, using a priority table, that Bluetooth communication is prioritized over WiFi communication;
   causing the WiFi radio to send a sleep notification to the access point, the sleep notification indicating that the WiFi radio is entering a sleep state for a sleep duration;
   causing the Bluetooth radio to transmit the fourth data using the first antenna during the sleep duration;
   causing the second antenna to remain idle during the sleep duration; and
   causing the WiFi radio to receive the third data using the first antenna and the second antenna after the sleep duration elapses.

3. The method of claim 1, further comprising:
   determining an amount of time between a current time and a time at which the first data reception duration is scheduled to begin;
   determining that the first data transmission duration is longer than the amount of time; and
   causing the WiFi radio to transmit a second portion of the first data using the first antenna and the second antenna for the amount of time.

4. The method of claim 1, further comprising:
   receiving a third request from the WiFi radio to transmit third data;
   receiving, prior to transmission of the third data, a fourth request from the Bluetooth radio to receive fourth data;
   determining that one antenna is requested to transmit the third data;
   determining that the Bluetooth signal strength is equal to or greater than a second threshold, wherein the second threshold is representative of a signal strength at which concurrent Bluetooth reception and WiFi transmission can occur;
   causing the WiFi radio to transmit the third data using the second antenna; and
   causing the Bluetooth radio to receive the fourth data using the first antenna while the third data is transmitted.

5. A device comprising:
   a first antenna and a second antenna;
   at least one memory that stores computer-executable instructions; and
   at least one processor configured to access the memory and execute the computer-executable instructions to:
     receive a first request for a first wireless radio to transmit first data for a first duration;

receive a second request for a second wireless radio to receive second data during the first duration;
determine that a first signal strength associated with the first wireless radio is less than or equal to a first threshold;
determine that a second signal strength associated with the second wireless radio is less than or equal to the first threshold;
determine that communication associated with the first wireless radio has a higher priority than communication associated with the second wireless radio;
cause the first wireless radio to transmit the first data using the first antenna for the first duration; and
cause the second antenna to be idle during the first duration.

6. The device of claim 5, wherein the at least one processor is further configured to access the memory and execute the computer-executable instructions to:
cause the second wireless radio to send a sleep notification indicating that the second wireless radio will enter a sleep state for the first duration; and
cause the second wireless radio to receive the second data using the first antenna and the second antenna after the first duration.

7. The device of claim 5, wherein the at least one processor is further configured to access the memory and execute the computer-executable instructions to:
receive a third request for the second wireless radio to transmit third data for a second duration;
receive a fourth request for the first wireless radio to receive fourth data during the second duration;
determine that the third request comprises a request to transmit a plurality of spatial streams;
determine that communication associated with the second wireless radio has a higher priority than communication associated with the first wireless radio; and
cause the second wireless radio to transmit the third data using the first antenna and the second antenna for the second duration.

8. The device of claim 5, wherein the at least one processor is further configured to access the memory and execute the computer-executable instructions to:
receive a third request for the second wireless radio to transmit third data for a second duration;
receive a fourth request for the first wireless radio to receive fourth data during the second duration;
determine that the third request comprises a request to transmit a single spatial stream;
determine that the first signal strength is equal to or greater than a second threshold;
cause the second wireless radio to transmit the third data using the second antenna; and
cause the first wireless radio to receive the fourth data using the first antenna while the third data is received.

9. The device of claim 5, wherein the at least one processor is further configured to access the memory and execute the computer-executable instructions to:
receive a third request for the first wireless radio to transmit third data for a second duration;
receive a fourth request for the second wireless radio to receive fourth data during the second duration;
determine that the first signal strength is equal to or greater than the first threshold;
cause the first wireless radio to transmit the third data using the first antenna; and
cause the second wireless radio to receive the fourth data using the first antenna and the second antenna while the third data is transmitted.

10. The device of claim 5, wherein the at least one processor is further configured to access the memory and execute the computer-executable instructions to:
receive a third request for the second wireless radio to transmit third data for a second duration;
receive a fourth request for the first wireless radio to receive fourth data during the second duration;
determine that the first signal strength is equal to or greater than the first threshold;
cause the second wireless radio to transmit the third data using the first antenna and the second antenna; and
cause the first wireless radio to receive the fourth data using the first antenna while the third data is transmitted.

11. The device of claim 5, wherein the at least one processor is further configured to access the memory and execute the computer-executable instructions to:
receive a third request from the second wireless radio to transmit an acknowledgment notification; and
prioritize the communication associated with the third request over the communication associated with the first request.

12. The device of claim 5, wherein the at least one processor is further configured to access the memory and execute the computer-executable instructions to:
receive a third request for the second wireless radio to transmit third data for a second duration;
receive a fourth request for the first wireless radio to receive fourth data;
determine an amount of time before the reception of the fourth data is to be initiated;
cause the second wireless radio to transmit a first portion of the third data using the first antenna and the second antenna for the amount of time; and
cause the second wireless radio to transmit a second portion of the third data after the fourth data is received.

13. The device of claim 5, wherein the at least one processor is further configured to access the memory and execute the computer-executable instructions to:
cause a switch to couple the first wireless radio to the first antenna; and
cause the switch to decouple the first wireless radio from the first antenna after the first duration.

14. The device of claim 5, wherein the first wireless radio is a Bluetooth radio, and the second wireless radio is a WiFi radio, and wherein the at least one processor is configured to determine that communication associated with the first wireless radio is prioritized over communication associated with the second wireless radio by accessing the memory and execute the computer-executable instructions to:
determine that a first buffer level for a first buffer associated with the first wireless radio is less than a second buffer level for a second buffer associated with the second wireless radio.

15. A device comprising:
a first antenna;
a second antenna;
a Bluetooth radio;
a WiFi radio;
at least one memory that stores computer-executable instructions; and
at least one processor configured to access the memory and execute the computer-executable instructions to:

determine a first request for the Bluetooth radio to transmit first data for a first duration;

determine a second request for the WiFi radio to receive second data during the first duration;

determine that a first signal strength associated with the Bluetooth radio and a second signal strength associated with the WiFi radio is less than or equal to a first threshold;

transmit, using the WiFi radio, a sleep notification indicating that the WiFi radio will enter a sleep state for the first duration;

transmit, using the Bluetooth radio, the first data using the first antenna for the first duration;

cause the second antenna to be idle during the first duration; and receive, using the WiFi radio, the second data using the first antenna and the second antenna after the first duration.

16. The device of claim 15, wherein the at least one processor is further configured to access the memory and execute the computer-executable instructions to:

determine that communication associated with the Bluetooth radio is prioritized over communication associated with the WiFi radio.

17. The device of claim 15, wherein the at least one processor is further configured to access the memory and execute the computer-executable instructions to:

determine a third request for the WiFi radio to transmit third data for a second duration;

determine a fourth request for the Bluetooth radio to receive fourth data during the second duration;

determine that the third request comprises a request to transmit a plurality of spatial streams;

determine that communication associated with the WiFi radio is prioritized over communication associated with the Bluetooth radio; and cause the WiFi radio to transmit the third data using the first antenna and the second antenna for the second duration.

18. The device of claim 15, wherein the at least one processor is further configured to access the memory and execute the computer-executable instructions to:

cause a switch to couple the Bluetooth radio to the first antenna; and cause the switch to decouple the Bluetooth radio from the first antenna after the first duration.

19. The device of claim 15, wherein the at least one processor is further configured to access the memory and execute the computer-executable instructions to:

determine a third request from the WiFi radio to transmit an acknowledgment notification; and prioritize the communication associated with the third request over the communication associated with the second request.

20. The device of claim 15, wherein the at least one processor is further configured to access the memory and execute the computer-executable instructions to:

determine that a first buffer level for a first buffer associated with the Bluetooth radio is less than a second buffer level for a second buffer associated with the WiFi radio.

* * * * *